United States Patent
Dai et al.

(10) Patent No.: US 10,792,138 B2
(45) Date of Patent: Oct. 6, 2020

(54) CLEANING DEVICE

(71) Applicant: SHANGHAI SHIFT ELECTRICS CO., LTD., Shanghai (CN)

(72) Inventors: Xiaoguo Dai, Shanghai (CN); Zhenwu Xu, Shangha (CN); Ling Dai, Shanghai (CN)

(73) Assignee: Shanghai Shift Electrics Co., Ltd., Shanghai (CN)

(*) Notice: Subject to any disclaimer, the term of this patent is extended or adjusted under 35 U.S.C. 154(b) by 494 days.

(21) Appl. No.: 15/547,431

(22) PCT Filed: Jan. 28, 2015

(86) PCT No.: PCT/CN2015/071698
§ 371 (c)(1),
(2) Date: Nov. 29, 2017

(87) PCT Pub. No.: WO2016/119137
PCT Pub. Date: Aug. 4, 2016

(65) Prior Publication Data
US 2018/0185128 A1  Jul. 5, 2018

(51) Int. Cl.
*A61C 17/34* (2006.01)
*H02K 7/06* (2006.01)
(Continued)

(52) U.S. Cl.
CPC .......... *A61C 17/3481* (2013.01); *A61C 17/32* (2013.01); *A61C 17/3418* (2013.01);
(Continued)

(58) Field of Classification Search
CPC ..... A61C 17/32; A61C 17/34; A61C 17/3481; A61C 17/3418; A61C 17/3436; H02K 7/06; H02K 7/065
See application file for complete search history.

(56) References Cited

U.S. PATENT DOCUMENTS 5,263,218 A    11/1993  Giuliani et al.
7,067,945 B2 *  6/2006  Grez .................. A61C 17/3418
                                                       310/50
(Continued)

FOREIGN PATENT DOCUMENTS

CN    1125919 A    7/1996
CN    1163586 A    10/1997
(Continued)

*Primary Examiner* — Laura C Guidotti
(74) *Attorney, Agent, or Firm* — BakerHostetler

(57) ABSTRACT

Provided is a cleaning device for personal cleaning and care, comprising a cleaning device housing detachably connected to a handle housing, a bracket for supporting the cleaning device, a cleaning element carrier and cleaning elements distributed on the cleaning element carrier, a passive assembly, and a cleaning device transducer. The cleaning device transducer comprises at least two transducer elastic elements; one end of each transducer elastic element is fixedly connected to a corresponding transducer elastic element retainer, and the other end of each transducer elastic element is fixedly connected to an transmission arm of the transducer bracket coupling elastic element; wherein a cleaning device having a natural vibration frequency $f_{natural}$ is constituted utilizing the bending strain of an elastic material, such that the natural frequency $f_{natural}$ of the cleaning device is in the range of 100 Hz to 400 Hz, and the relationship between the natural frequency $f_{natural}$ and the frequency $f_0$ of the electromagnetic force produced by the drive coil in the handle satisfies: $0.85f_0 < f_{natural} < 1.05f_0$. The present cleaning device has a compact structure and an aesthetically pleasing shape, rotates steadily, and produces little noise.

25 Claims, 16 Drawing Sheets

(51) Int. Cl.
*A61C 17/32* (2006.01)
*H02K 7/065* (2006.01)
*B26B 19/28* (2006.01)

(52) U.S. Cl.
CPC ........... *A61C 17/3436* (2013.01); *H02K 7/06* (2013.01); *H02K 7/065* (2013.01); *B26B 19/284* (2013.01)

(56) References Cited

U.S. PATENT DOCUMENTS

| | | | |
|---|---|---|---|
| 8,695,143 B2* | 4/2014 | Kloster | A61C 17/32 15/22.1 |
| 8,813,330 B2* | 8/2014 | Grez | A61C 17/3418 29/402.01 |
| 2002/0088068 A1 | 7/2002 | Levy et al. | |
| 2014/0015346 A1 | 1/2014 | Schober et al. | |

FOREIGN PATENT DOCUMENTS

| | | | |
|---|---|---|---|
| CN | 1681628 A | 10/2005 | |
| CN | 101297775 A | 11/2008 | |
| JP | H11342140 A | 12/1999 | |
| WO | 2005058190 A1 | 6/2005 | |

* cited by examiner

CLEANING DEVICE

CROSS-REFERENCE TO RELATED APPLICATION(S)

This application is the National Stage of International PCT Application No. PCT/CN2015/071698 filed on Jan. 28, 2015 and is herein incorporated by reference in its entirety.

TECHNICAL FIELD

The present invention relates to a cleaning device, and specifically to a cleaning device used for personal cleaning and fitted onto a handle housing to convert a reciprocating motion into a rotary motion.

BACKGROUND

For personal cleaning care appliances such as electric toothbrushes, electric shavers, electric face cleansing instrument, electric showers, etc., it is important that there should be cleaning devices that can convert the reciprocating motion into a desired rotary motion of the cleaning elements, and these cleaning devices should be structurally simple, easy to assemble, long in service life and safe and reliable.

There are known a number of drive structures for driving the cleaning elements, such as motors, magnetic systems and electromagnetic systems. Some drive structures use bearings (such as ball bearings) to support the driver, and such structures are both expensive and complex, and also have noise and motor damping.

CN 100591301C discloses a device for converting a lateral motion into a rotary motion of an appliance workpiece, wherein the drive assembly comprises an electromagnet which is capable of generating a lateral force and engaging with two permanent magnets in operation, and the permanent magnets are fixed to the moveable end pieces located at the rear end of the motion conversion assembly so as to move the end pieces in a side-to-side slightly arcuate translation manner. The motion conversion assembly converts the driving action of the drive assembly into the twisting or rotating action of the drive shaft by providing a leaf spring, and the drive shaft then rotates the brush head arm and the brush head so that they rotate around the longitudinal axis of the drive shaft.

CN 101297775B discloses a method for adjusting the elastic elements of a resonant driving system, wherein the spring elements are not bent, but by fully changing the stiffness of the elastic elements, their resonant frequency is changed so as to be very close to the driving frequency of the appliance.

SUMMARY

The technical problem to be solved by the present invention is to provide a cleaning device used for personal cleaning care and fitted onto a handle housing to convert a reciprocating motion into a rotary motion, and the cleaning device is structurally simple and compact, inexpensive, easy to assemble, smooth to rotate, low noise, low damping, safe and reliable, and has an even more esthetic appearance.

To solve the above technical problem, the present invention provides a cleaning device for personal cleaning care and converting a reciprocating motion into a rotary motion, comprising: a cleaning device housing detachably connected to a handle housing; a bracket for supporting the cleaning device, detachably fixed to the cleaning device housing; a cleaning element carrier and cleaning elements distributed on the cleaning element carrier, wherein one end of the cleaning element carrier opposite to an end of the cleaning element carrier having the cleaning elements distributed is coupled with the cleaning device housing with a seal; a passive assembly which is located above a drive coil in the handle housing and comprises a permanent magnet carrier and a plurality of permanent magnets, wherein the permanent magnet carrier is fixed to an end of a cleaning device transducer opposite to a cleaning element carrier coupling shaft, and the plurality of permanent magnets are fixed to the permanent magnet carrier. The cleaning device transducer comprises a transducer bracket, at least two transducer elastic elements, transducer elastic element retainers and a cleaning element carrier coupling shaft, wherein the cleaning element carrier coupling shaft is tightly inserted into the cleaning element carrier so that the cleaning device transducer is fixedly coupled with the cleaning element carrier, one end of each transducer elastic element is fixedly coupled with a corresponding transducer elastic element retainer, and the other end of each transducer elastic element is fixedly coupled with a transmission arm of a transducer bracket coupling elastic element; wherein the cleaning device having a natural vibration frequency $f_{natural}$ is constituted utilizing the bending strain of an elastic material, so that the natural frequency $f_{natural}$ of the cleaning device is in a range of 100 Hz to 400 Hz, and a relationship between the natural frequency $f_{natural}$ and a frequency $f_0$ of an electromagnetic force generated by the drive coil in the handle meets $0.85 f_0 < f_{natural} < 1.05 f_0$. When the natural vibration frequency $f_{natural}$ is the same as the frequency $f_0$ of the electromagnetic force generated by the drive coil in the handle, the cleaning device is made into a resonant vibration state; when the natural vibration frequency $f_{natural}$ is close to the frequency $f_0$ of the electromagnetic force generated by the drive coil in the handle, the cleaning device is brought into a resonance oscillation state.

The above technical solution has beneficial technological effects as follows. The technical solution of the present invention creatively introduces at least two transducer elastic elements, and the bending strain of the elastic material is used to constitute a cleaning device having a natural vibration frequency $f_{natural}$. According to the vibration principle, the cleaning device is forced to reciprocally rotate by the driving frequency $f_0$ of the drive coil in the handle housing; when the natural frequency $f_{natural}$ of the cleaning device is very close to the driving frequency $f_0$, the electromagnetic force generated by the drive coil in the handle housing and acting upon the cleaning device brings the cleaning device into a resonance oscillation state; when the natural frequency $f_{natural}$ of the cleaning device is equal to the driving frequency $f_0$, the electromagnetic force generated by the drive coil in the handle housing and acting upon the cleaning device brings the cleaning device into a resonant vibration state. It is well known that the energy transfer efficiency in a resonance oscillation state or resonant vibration state is very high. In the present invention, due to the reasonable configuration of at least two transducer elastic elements and a plurality of permanent magnets, it is possible to achieve a smooth rotation of the cleaning device, thereby eliminating some of the restraining pieces that must be provided in order to achieve the rotation of the cleaning device, such as bearings etc. Further, in the present invention, since the plurality of permanent magnets are reasonably arranged so that the electromagnetic resultant force received on the passive assembly is close to zero, and a torque acting on the passive assembly is cleverly utilized, it is possible to omit the restraining structure (such as a bearing structure, etc.), and thus the cleaning device is made more compact in structure, more stable in rotation, and less noisy. Furthermore, compared with a structure in which only one transducer elastic element is provided, the cleaning device structure of the present invention has lower noise and higher efficiency.

On the one hand, in order to achieve the purpose of efficient cleaning, the personal cleaning care appliance is generally required to have a speed of about 6000 to 24000 rpm, that is, the natural frequency of the cleaning device is 100 to 400 Hz. Experiments show that when the natural frequency of the cleaning device is 100 to 400 Hz, a better technological effect results. Further, the natural frequency $f_{natural}$ of the cleaning device is 250 Hz. Taking a reciprocating rotation of 15000 rpm as an example, that is, the natural frequency of the cleaning device is about 250 Hz, experiments show that the reciprocating high-speed motion of the cleaning element in the frequency of about 250 Hz can make the air and liquid around the cleaning element interact to form a gas explosion, and this irregular turbulence can establish a process of accumulating energy and instantaneously releasing energy that is very effective in removing stubborn stains, such as dental plaque on the tooth surface and the like. Still further, the natural frequency $f_{natural}$ of the cleaning device is in the range of 220 Hz to 280 Hz. Experiments further show that when the natural frequency of the cleaning device is between 220 to 280 Hz, a very effective effect similar to that obtained when the natural frequency is 250 Hz can be achieved. On the other hand, when $0.85f_0 < f_{natural} < 1.05f_0$ is met, that is, when the range of the natural frequency is controlled between 0.85 to 1.05 times the driving frequency $f_0$, experiments show that it is possible to achieve the best resonance oscillation effect and maintain a very efficient energy transfer, which is very helpful for achieving a high-speed reciprocating rotary motion of the cleaning element.

In one embodiment, the transducer elastic elements comprise two transducer elastic elements, i.e., first and second transducer elastic elements, which are parallel with each other and are symmetrically distributed with respect to a rotation axis or a line parallel with the rotation axis, wherein the first and second transducer elastic elements are located on both sides of the rotation axis of the transducer bracket respectively and the angle between the first and second transducer elastic elements is 180°. Hence, by providing two transducer elastic elements having an angle of 180°, and by arranging two transducer elastic elements to be symmetrically distributed with respect to the rotation axis or a line parallel with the rotation axis, it is possible that the forces on all transducer elastic elements are equivalent to the electromagnetic resultant force on the rotation axis of the cleaning device transducer and the electromagnetic resultant force on the rotation axis of the cleaning device transducer is substantially zero, and that a torque around the rotation axis of the cleaning device transducer or a line parallel with the rotation axis is produced.

In another embodiment, the transducer elastic elements comprise two transducer elastic elements, i.e., the first and second transducer elastic elements, which are located on both sides of the rotation axis of the transducer, and the angle therebetween is $\alpha$, wherein $90° < \alpha < 180°$ or $90° < \alpha < 270°$.

The beneficial technological effect of the present technical solution can be explained as follows: for example, assuming that, when the drive coil applies an electromagnetic force to the permanent magnet and the passive assembly is subjected to a clockwise torque, the transmission arm of the transducer bracket coupling elastic element of the cleaning device transmits a torque to the first and second transducer elastic elements, so that the first transducer elastic element generates a bending strain around the transducer elastic element retainer in the counterclockwise direction; the second transducer elastic element also generates a bending strain around the transducer elastic element retainer in the counterclockwise rotation direction; and the transducer rotates clockwise around a rotation axis. Contrarily, when the passive assembly is subjected to a counterclockwise torque, the transmission arm of the transducer bracket coupling elastic element of the cleaning device transmits a torque to the first and second transducer elastic elements, so that the first and second transducer elastic elements generate clockwise bending strains around their respective transducer elastic element retainers, and the transducer makes a counterclockwise rotation around the rotation axis. Hence, according to different occasions and requirements, the angle $\alpha$ can be adjusted flexibly so that the overall force reaches the desired state to maintain an optimum performance.

More preferably, the transducer elastic elements may comprise three transducer elastic elements, wherein any two of the transducer elastic elements have an angle $\beta$ with respect to the third transducer elastic element, and $90° < \beta < 180°$, and an angle between the any two transducer elastic elements is $\delta$, $\delta = 360° - 2\beta$. By reasonably setting the shapes, dimensions and relative positions of the first transducer elastic element, the second transducer elastic element and the third transducer elastic element, it is also possible to balance the force on the cleaning device transducer and to bear the torque, and to thereby reach satisfactory effects.

More preferably, the transducer elastic elements comprise rectangular elastic elements or sheet type elastic elements. The circular elastic elements and the sheet type elastic elements are common elastic elements in industrial applications, and they are easy to be obtained from the market.

More preferably, each of the sheet type elastic elements has a thickness less than its length and width, and the thickness is between 0.05 mm to 1 mm. The transducer of the present invention is provided with at least two elastic elements; two or more elastic elements may be equivalent to a plurality of springs, and the plurality of springs is equivalent to a virtual spring. The virtual spring and the mass m constitute a spring oscillator system. The spring stiffness factor in the spring oscillator system is the stiffness factor of this virtual spring, so the performance of a single elastic element directly affects the spring stiffness factor in the spring oscillator system. In the following, a description is made by taking a rectangular elastic element (a type of sheet type elastic element) as an example. Definition: $K_{1rectangular}$ is an equivalent stiffness factor of a single rectangular elastic element when being subjected to bending deformation; the geometrical thickness of the rectangular elastic element in the force direction is h; the geometric dimension of the rectangular elastic element in a direction from the force bearing point toward a fixation point, i.e., the direction of the force arm, has a length L and a width b; according to the principle of solid mechanics, the $K_{1rectangular}$ is directly proportional to $\delta h^3/L^3$, and the thickness h is highly correlated with the stiffness factor $K_{1rectangular}$, thus by adjusting the thickness h, different $K_{1rectangular}$ can be obtained. Through experiments and calculations, it is found that when the thickness of the sheet type elastic element is between 0.05 mm and 1 mm, the desired stiffness factor can be obtained, and then a better effect can be reached.

More preferably, the plurality of permanent magnets are configured in such a way that, when an alternating current flows through the drive coil fixed in the handle housing and the drive coil and the plurality of permanent magnets interact to generate an electromagnetic force, a resultant force of the electromagnetic forces generated between the drive coil and the plurality of permanent magnets and acting on the passive assembly is close to zero, i.e., the force acting on the passive assembly is balanced, and at the same time, the passive assembly is subjected to a torque rotating in a clockwise or counterclockwise direction formed by the electromagnetic forces, wherein the maximum projection area formed by projecting the minimum plane of the same horizontal section containing all the permanent magnets of the passive assembly on a plane perpendicular to a rotation axis of the cleaning device transducer, is less than about 30 mm×30 mm to 60 mm×60 mm. By reasonably arranging the relative position between the plurality of permanent magnets and the drive coil on the cleaning device, when an alternating current passes through the drive coil, the passive assembly is subjected to an equilibrium force where the electromagnetic resultant force is close to zero, and a torque, the direction of which varies with the variation of the direction of the current in the drive coil, is generated, and thereby the passive assembly is driven by the drive coil to repeatedly rotate in the clockwise direction and counterclockwise direction, thus achieving the effect that the resultant force is close to zero, and the force equilibrium is reached, while only a torque is generated; therefore, it is possible to omit parts such as the bearings so that the structure is more compact.

More preferably, the plurality of permanent magnets comprise four permanent magnets, i.e., two first permanent magnets each having an S-pole that faces the drive coil for example and two second permanent magnets each having an N-pole that faces the drive coil for example, wherein the second permanent magnet on the left side and the first permanent magnet on the left side are substantially symmetrically distributed with respect to an iron core of the drive coil; the first permanent magnet on the right side and the second permanent magnet on the right side are substantially symmetrically distributed with respect to the iron core of the drive coil; a transversal center line of the second permanent magnet on the upper left side is aligned with a transversal center line of the first permanent magnet on the upper right side; a transversal center line of the first permanent magnet on the lower left side is aligned with a transversal center line of the second permanent magnet on the lower right side; the above two transversal center lines are parallel with each other; and when the current is energized, at the same time, the current direction of the current formed by projecting the current in the drive coil on the plane of the first permanent magnet on the same side is opposite to the current direction of the current formed by projecting the current in the drive coil on the plane of the second permanent magnet on the same side. The drive coil is fixed in the drive handle. When the current I flows through the drive coil, electromagnetic forces $F_1$, $F_2$, $F_3$, $F_4$ are generated respectively between the drive coil and the four permanent magnets. Since the four permanent magnets are evenly and symmetrically distributed with respect to the iron core of the drive coil, the electromagnetic forces $F_1$, $F_2$ and $F_3$, $F_4$ are essentially equal in magnitude and opposite in direction, that is, the electromagnetic resultant force received by the passive assembly is close to zero, that is to say, the received forces reach a balance, and only a torque exists, so the parts such as the bearings can be omitted so that the structure is more compact.

In view of the electric toothbrush and electric shaver, preferably, the maximum projection area formed by projecting the minimum plane of the same horizontal section containing all the permanent magnets of the passive assembly on the plane perpendicular to a rotation axis of the cleaning device transducer, is less than or equal to 30 mm×30 mm. As to the electric face cleansing instrument and the electric shower, preferably, the maximum projection area formed by projecting the minimum plane of the same horizontal section containing all the permanent magnets of the passive assembly on the plane perpendicular to a rotation axis of the cleaning device transducer, is less than or equal to 60 mm×60 mm. The above two different designs for the maximum projected area mainly consider different applications.

Figure 1:
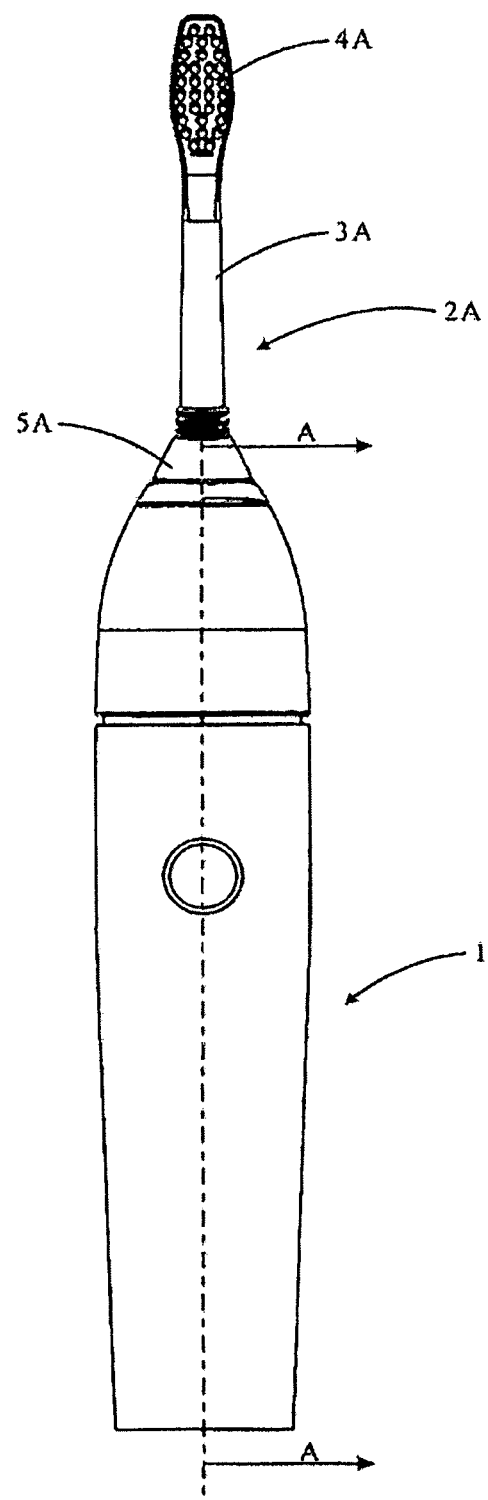
FIG. 1 is a front view of the cleaning device for personal cleaning care of the present invention.

DESCRIPTION OF MAIN REFERENCE NUMERALS 1 drive handle
2A, 2B, 2D cleaning device
3A, 3B, 3D cleaning element carrier on the cleaning device
4A, 4B, 4D cleaning element (e.g., toothbrush bristle)
5A, 5B seal
10 handle housing 11 electronic circuit board assembly PCBA
12 batteries or power supply
13 charge coil
14 drive coil
15 iron core of the drive coil
16 switch
17 switch button
20A, 20B, 20D cleaning device housings of different structures
21A, 21B, 21D right bracket of the cleaning device of different structures
22A, 22B, 22D left bracket of the cleaning device of different structures
23A, 23B, 23C, 23D cleaning device transducer of different structures
24 first permanent magnet having an S-pole facing the drive coil of the handle
25 second permanent magnet having an N-pole facing the drive coil of the handle
26 permanent magnet carrier
27A, 27B, 27D locking screw
23A1, 23B1, 23C1, 23D1 first transducer elastic element
23A2, 23B2, 23C2, 23D2 second transducer elastic element
23A31, 23B31, 23B32, 23C3, 23D3 transducer elastic element retainer
23A4, 23B4, 23C4, 23D4 transducer bracket
23A41, 23A42, 23B41, 23B42, 23C41, 23C42, 23D41, 23D42 transmission arm of the transducer bracket coupling elastic element
23A5, 23B5 cleaning element carrier coupling shaft
23C11, 23C22, 23C33 first, second, third transducer elastic elements respectively

DETAILED DESCRIPTION

Hereinafter, an exemplary embodiment of the present invention will be described in more detail with an electric toothbrush as a typical example of a cleaning device for personal cleaning care, and with reference to the accompanying drawings. Although only the electric toothbrush is used as an example, the present invention is not limited thereto. The present invention is also applicable to the electric shavers, the electric face cleansing instruments, the electric showers, and the like.

Throughout the accompanying drawings, similar reference numerals refer to similar parts.

For the sake of clarity, the present description employs terms expressing the spatial relative position, such as "up", "down", "upper", "lower", "left", "right", "transversal", "forward", "reversal" and so on, to briefly describe the interrelationships between one element or feature and another element(s) or feature(s) as shown in the figures, wherein the "up", "down", "upper" and "lower" are relative to the axis of the cleaning device; the upward direction facing the corresponding view and parallel to the axis of the cleaning device is defined as "up" or "upper", and the downward direction parallel to the axis of the cleaning device is defined as "down" or "lower"; the "left" and "right" are relative to the axis of the cleaning device; the left side of the axis of the cleaning device along the direction perpendicular to the axis of the cleaning device when facing the corresponding view is defined as "left", and the right side thereof is defined as "right"; the "transversal" means the direction perpendicular to the axis of the cleaning device; the "outwards" means the direction perpendicular to the paper surface and facing the operator; the "inward" means the direction perpendicular to the paper surface away from the operator.

Although the terms "first", "second", etc. are used in the present description to describe a plurality of elements or components, these elements or components are not to be limited by these words. These words are used only to distinguish one element or component from another element or component, not including "order". Thus, interchanging the ordinal numbers of those elements or components discussed below does not go beyond the conception and scope of the invention.

In addition, the word "and/or" as used in this application include any one of the listed one or more associated vocabularies or all combinations thereof.

In an embodiment of the present invention, as shown in FIGS. 1, 2, 5 and 6, a reciprocating cleaning device (e.g., the toothbrush head) 2A is detachably connected with a handle housing 10 of a handle 1 through a cleaning device housing 20A in a threaded connection manner for example, and such a threaded connection allows the drive handle 1 and the cleaning device 2A to be reliably connected together, and to be separated conveniently. Generally, the drive handle 1 is provided therein with a battery 12 or power supply, an electronic circuit board assembly PCBA 11, a switch 16, a charge coil 13, and the like. The drive handle 1 of the present invention is also provided with a drive coil 14 therein, and the hollow portion of the drive coil 14 is provided with an iron core 15 of the drive coil having high magnetic permeability characteristic. The handle housing 10 is also provided with a switch button 17 used to start or stop the operation of the drive handle 1. The drive handle 1 is provided with a recess in the direction adjacent to the cleaning device to accommodate part of the cleaning device.

Figure 2:
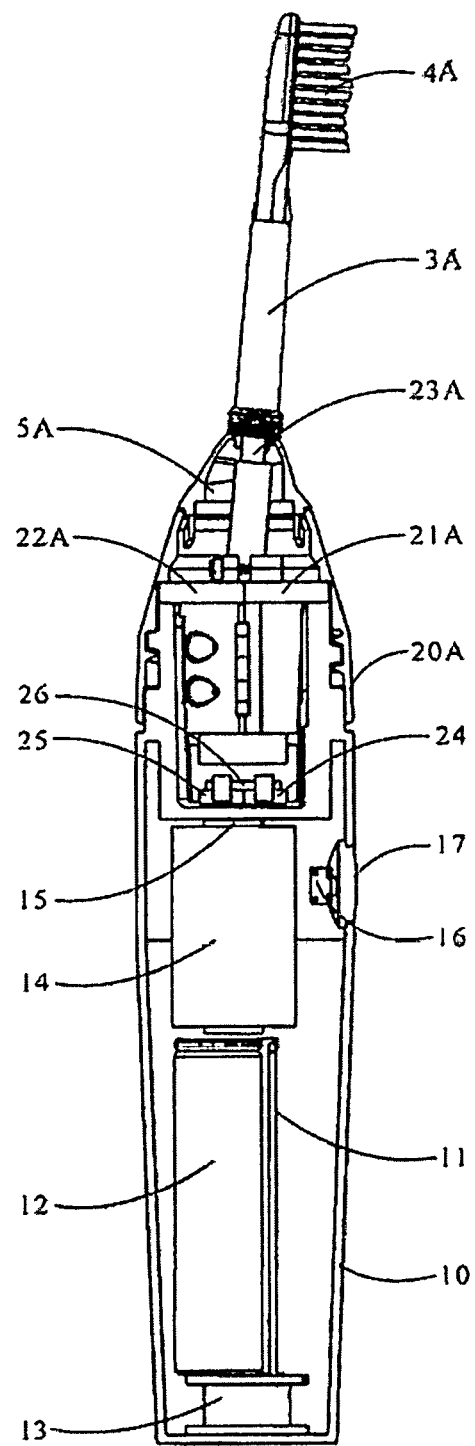
FIG. 2 is a partial sectional view taken along the line A-A in FIG. 1.
Figure 5:
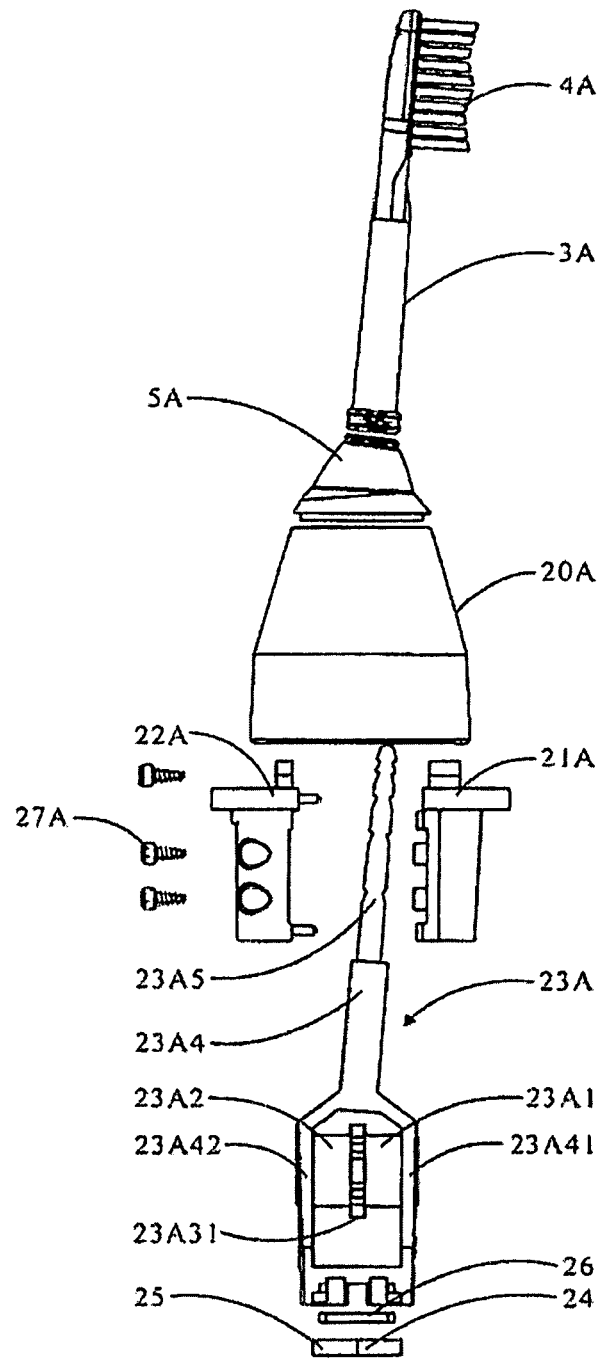
FIG. 5 is an exploded schematic view of the cleaning device shown in FIG. 4.
Figure 6:
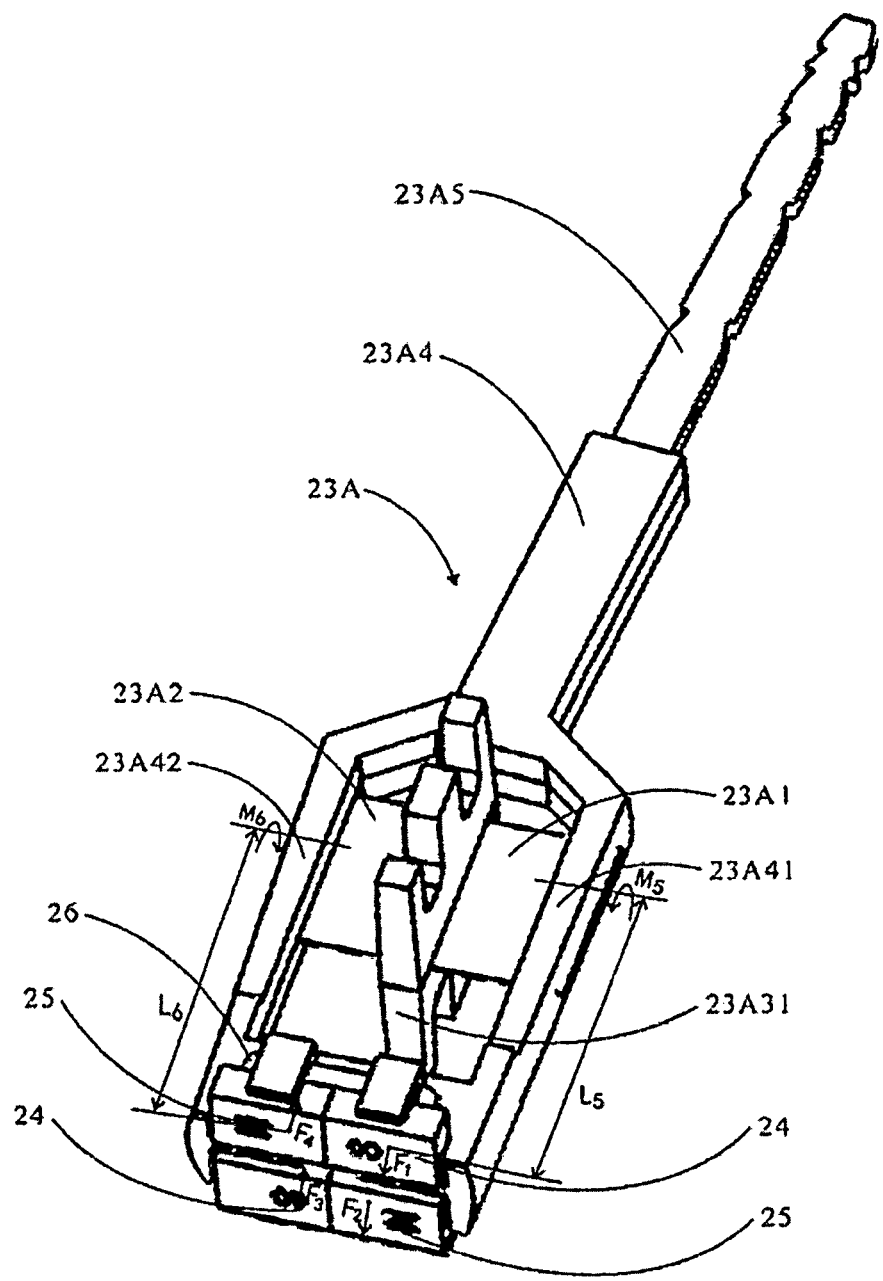
FIG. 6 is a perspective view of the cleaning device transducer in FIG. 4.

As shown in FIGS. 1, 2 and 5, the cleaning device 2A comprises a cleaning device housing 20A, a right bracket 21A of the cleaning device and a left bracket 22A of the cleaning device for supporting the cleaning device 2A, a cleaning device transducer 23A, a passive assembly, a seal 5A, a cleaning element carrier 3A and cleaning elements 4A. The right and left brackets 21A, 22A of the cleaning device may be connected and detachably fixed onto the cleaning device housing 20A by a retainer, such as a screw. As shown in FIG. 6, the cleaning device transducer 23A may be integrally molded by injection of, for example, the first transducer elastic element 23A1, the second transducer elastic element 23A2, the transducer bracket 23A4, the transducer elastic element retainer 23A31, and the cleaning element carrier coupling shaft 23A5, and it may also be assembled from individual parts. The cleaning element carrier coupling shaft 23A5 is tightly inserted into the cleaning element carrier 3A, so that the cleaning device transducer 23A is fixedly coupled to the cleaning element carrier 3A. The cleaning elements 4A is distributed on the cleaning element carrier 3A, the cleaning elements 4A may be an article such as toothbrush bristles. One end of the seal 5A is coupled with the cleaning element carrier 3A, and the other end of the seal 5A is coupled with the cleaning device housing 20A. The passive assembly is constituted by a plurality of first and second permanent magnets 24, 25 and a permanent magnet carrier 26, The first permanent magnet 24 and the second permanent magnet 25 may have a rectangular parallelepiped form and are alternately distributed on both sides of the iron core 15 of the drive coil, and the permanent magnet carrier 26 is fixed to the end of the cleaning device transducer 23A opposite to the cleaning element carrier coupling shaft 23A5. The plurality of first and second permanent magnets 24, 25 are fixed to the permanent magnet carrier 26. The polarity of the first permanent magnet 24 in the direction facing the drive coil 14 is opposite to the polarity of the second permanent magnet 25 in the direction facing the drive coil 14.

Figure 3:
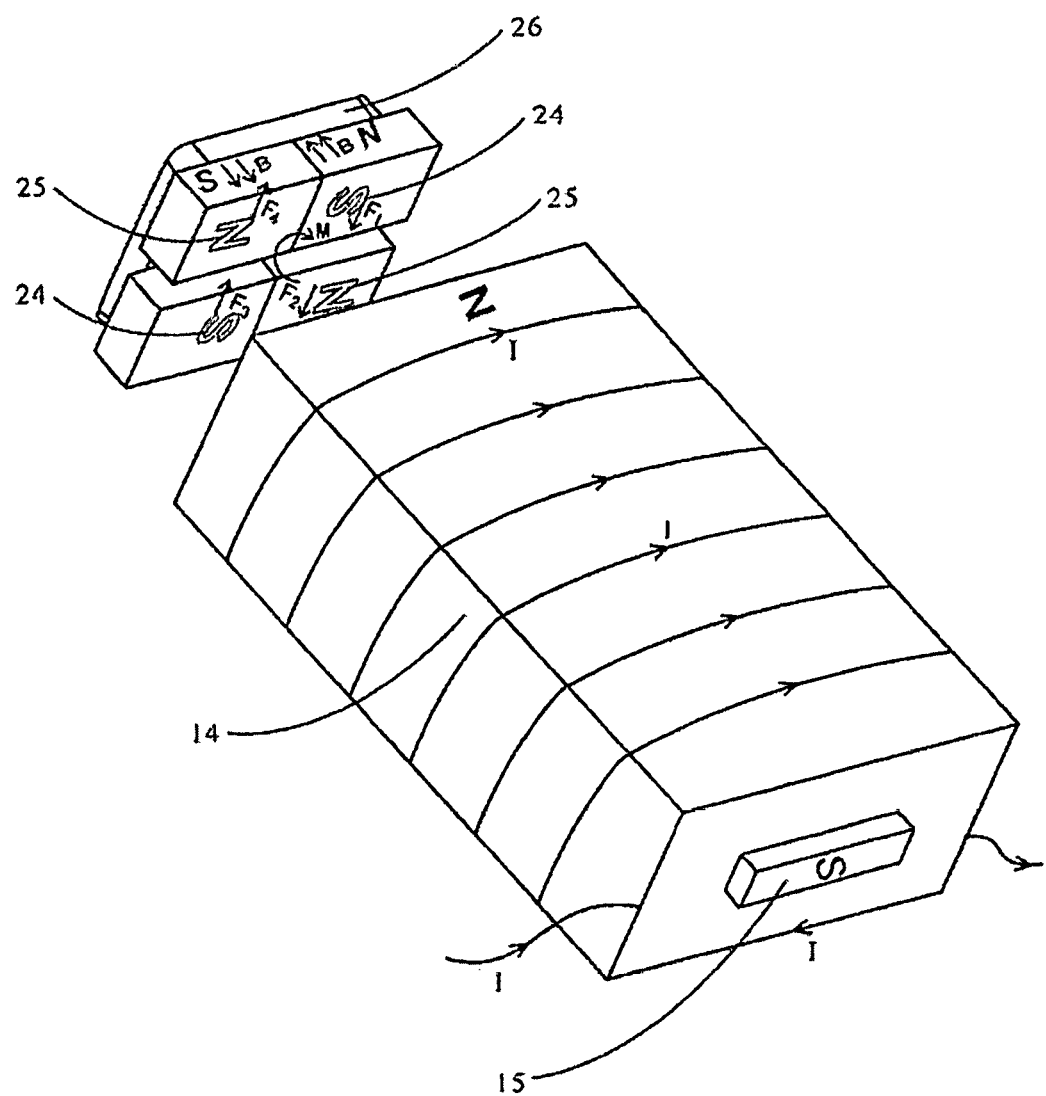
FIG. 3 is a perspective schematic view showing the relative position of the drive coil to the permanent magnets.

As shown in FIGS. 3, 5, 6 and 7, in this example, the passive assembly may comprise for example two first permanent magnets 24 each having an S-pole facing the drive coil 14, and for example two second permanent magnets 25 each having an N-pole facing the drive coil 14. The relative positional relationships of the first permanent magnet 24, the second permanent magnet 25 and the drive coil 14 may be shown as in FIG. 3. In FIG. 3, the second permanent magnet 25 on the left side and the first permanent magnet 24 on the left side in the passive assembly may be substantially symmetrically distributed with respect to the iron core 15 of the drive coil, and the first permanent magnet 24 on the right side and the second permanent magnet 25 on the right side may be substantially symmetrically distributed with respect to the iron core 15 of the drive coil. The transversal center line of the second permanent magnet 25 on the upper left side is aligned with the transversal center line of the first permanent magnet 24 on the upper right side, and the transversal center line of the first permanent magnet 24 on the lower left side is aligned with the transversal center line of the second permanent magnet 25 on the lower right side, and the above two transversal center lines are parallel with each other. When the current is energized, the current direction of the current formed by projecting the current in the drive coil on the plane of the first permanent magnet on the same side is opposite to the current direction of the current formed by projecting the current in the drive coil on the plane of the second permanent magnet on the same side at the same time.

Figure 3B:
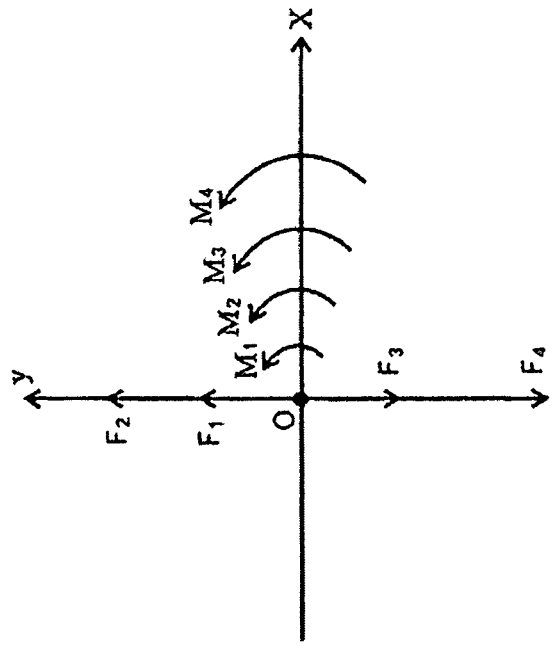
FIG. 3B is a schematic view of the mechanical analysis of the drive coil and the permanent magnets shown in FIG. 3.
Figure 3A:
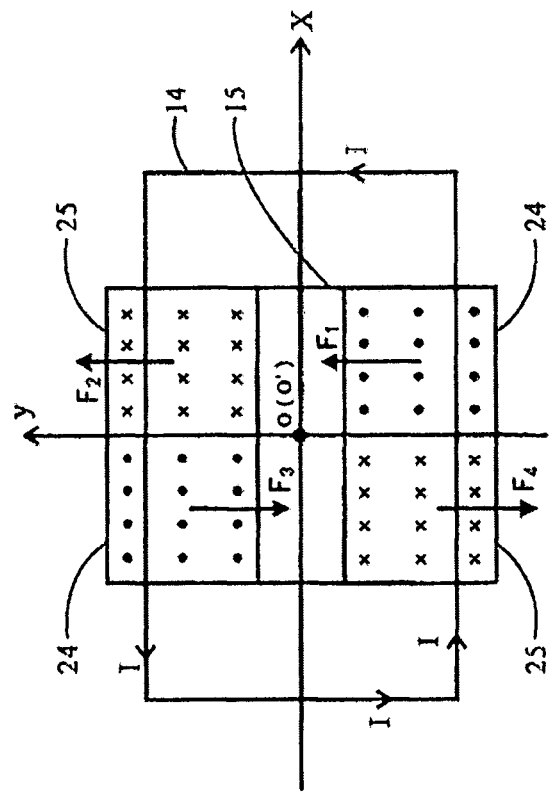
FIG. 3A is a projection schematic view of the mechanical analysis of the drive coil and the permanent magnets shown in FIG. 3.

In the present example shown in FIGS. 3, 3A, 3B, the drive coil 14 is fixed inside the drive handle 1. When current I flows through the drive coil 14, electromagnetic forces $F_1$, $F_2$, $F_3$, $F_4$ are generated between the drive coil 14 and the first permanent magnet 24 on the right side, the second permanent magnet 25 on the right side, the first permanent magnet 24 on the left side, and the second permanent magnet 25 on the left side, respectively. Due to the evenly symmetrical distribution of the first and second permanent magnets 24, 25 on the left and right sides with respect to the iron core 15 of the drive coil, the electromagnetic forces $F_1$, $F_2$ and $F_3$, $F_4$ are essentially equal in magnitude and opposite in direction, that is, the electromagnetic resultant force on the passive assembly is close to zero, that is to say, the forces on the passive assembly are balanced. As shown in FIG. 3, since the first and second permanent magnets 24, 25 on both left and right sides are reasonably distributed, clockwise torques $M_1$, $M_2$, $M_3$, $M_4$ may be generated on the passive assembly by the forces $F_1$, $F_2$, $F_3$, $F_4$, respectively; the torque M is the sum of the torques $M_1$, $M_2$, $M_3$, $M_4$, and the vector direction of the torque M is oriented toward the cleaning element. In the direction shown in FIG. 3B, the torque M drives the passive assembly to rotate in a counterclockwise direction, and the vector direction of the torque is also oriented toward the cleaning element. points to It is worth reminding that, the vector directions of the torques in FIGS. 3 and 3B are consistent, but due to the direction of the view, in the description, their respective torques are referred to as clockwise and counterclockwise respectively; in fact, the torques in FIGS. 3 and 3B are the same torque.

FIG. 3A is a projection schematic view of the mechanical analysis of FIG. 3. FIG. 3A shows the direction of each electromagnetic force more clearly. If coordinates are established by taking the center point O of the iron core 15 of the drive coil as the origin, the permanent magnets 24, 25 on the left side have the y-axis as the right border, and the first permanent magnet 24 on the left side and the second permanent magnet 25 on the left side are symmetrically distributed with respect to x-axis. The permanent magnet 24, 25 on the right side have the y-axis as the left border, and the first permanent magnet 24 on the right side and the second permanent magnet 25 on the right side are symmetrically distributed with respect to x-axis; the $F_1$, $F_2$, $F_3$ and $F_4$ in the Figures are forces acting on the permanent magnets 24, 25 respectively. Apparently, in the arrangement of the permanent magnets 24, 25 and the drive coil 14 shown in FIG. 3A, the forces $F_1$, $F_2$, $F_3$ and $F_4$ are identical in magnitude; $F_1$ and $F_2$ have identical directions; $F_3$ and $F_4$ have identical directions which are opposite to the directions of $F_1$ and $F_2$. FIG. 3B is a schematic view of the mechanical analysis of FIG. 3, and it shows the analytical result obtained by concentrating the forces onto the point O'. O' is the geometrical center of the permanent magnet group, and it is on the passive assembly. Line segment O-O' is parallel to or coincides with the rotation axis of the cleaning device transducer. In FIG. 3B, points O' and O coincide with each other, and the electromagnetic resultant force received by the passive assembly is zero, and the passive assembly is subjected to the action of torque M, wherein the torque M is the sum of torques $M_1$, $M_2$, $M_3$, $M_4$ generated by the forces $F_1$, $F_2$, $F_3$, $F_4$ respectively in the counterclockwise direction. Absolutely, the permanent magnets 24, 25 and the drive coil 14 may also have other arrangements without being limited thereto.

When the current opposite to the current I shown in FIG. 3 in direction flows through the drive coil 14, as stated above, the electromagnetic resultant force acting upon the passive assembly is zero, and a counterclockwise torque is generated, wherein the vector direction of the torque is oriented away from one end of the cleaning elements. Therefore, by reasonably arranging the relative position of the permanent magnets 24, 25 and the drive coil 14 in the cleaning device 2A, when an alternating current passes through the drive coil 14, the passive assembly receives an equilibrium force, in which the electromagnetic resultant force is zero, and a torque, the direction of which varies with the current direction variation of the drive coil 14, is generated, so that the passive assembly is driven by the drive coil 14 to rotate repeatedly in the clockwise and counterclockwise directions. Apparently, the relative positions of the permanent magnets 24, 25 and the drive coil 14 as well as the number of the permanent magnets are not limited to this example, and the skilled in this art could work out different arrangements without departing from the scope of the present invention. For example, the number of the permanent magnets 24, 25 may be two, three, five or six, and so on; alternatively, the positions of the permanent magnets 24, 25 on the left side are interchanged, or the positions of the permanent magnets 24, 25 on the right side are interchanged; alternatively, the permanent magnet plane on the left side and the upper plane of the drive coil 14 are distributed at an angle of β, and the permanent magnet plane on the right side and the upper plane of the drive coil 14 are distributed at an angle of −β.

Figure 3C:
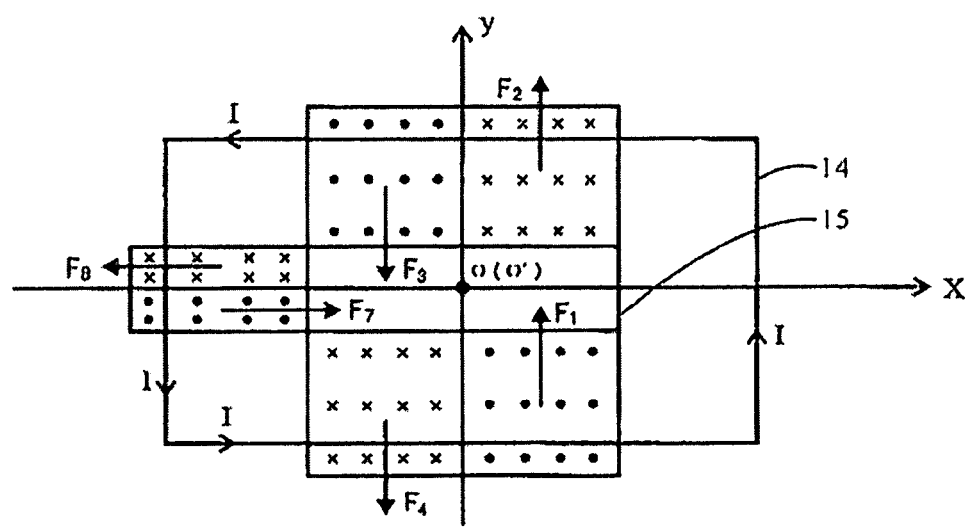
FIG. 3C is another configuration manner of the plurality of permanent magnets.
Figure 4:
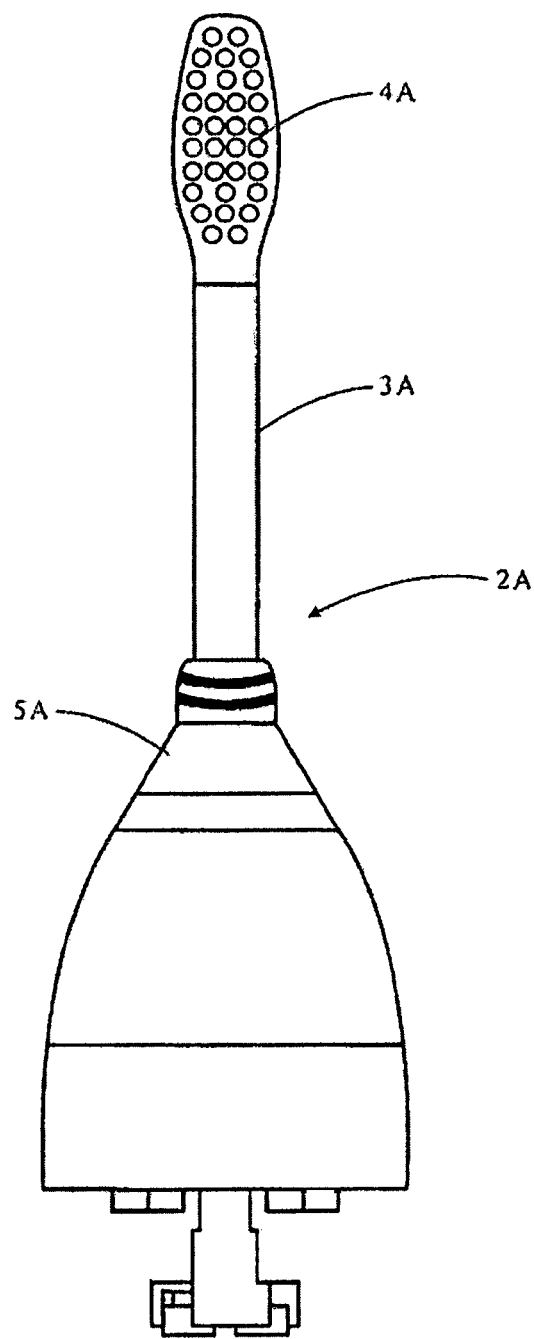
FIG. 4 is a front view of a cleaning device for personal cleaning care.

FIG. 3C illustrates an embodiment of six permanent magnets, that is, in addition to the original four permanent magnets, two permanent magnets are reasonably added and arranged with functions identical to those of the aforesaid four permanent magnets, i.e. making the magnetic field projection area larger and the effect better, and obviously, there are many other configurations, the principles of which are identical, which will not be enumerated here any more.

As shown in FIG. 3, the N-poles of the first permanent magnets 24 and the S-poles of the second permanent magnets 25 are immovably fixed to the permanent magnet carrier 26, and the passive assembly is constituted by the first permanent magnets 24, the second permanent magnets 25 and the permanent magnet carrier 26. Although only one passive assembly is shown in the present embodiment, it is also possible to provide a plurality of passive assemblies which have no relative movement with each other according to the present invention.

Preferably, the maximum projection area formed by projecting the minimum plane of the same horizontal section containing all the permanent magnets of the passive assembly on a plane perpendicular to a rotation axis of the cleaning device transducer, is less than or equal to 30 mm×30 mm to 60 mm×60 mm, which can be determined according to specific circumstances. As to the electric toothbrush and the electric shaver, the maximum projection area formed by projecting the minimum plane of the same horizontal section containing all the permanent magnets of the passive assembly on a plane perpendicular to a rotation axis of the cleaning device transducer is less than or equal to 30 mm×30 mm; as to the electric face cleansing instrument and electric shower, the maximum projection area formed by projecting the minimum plane of the same horizontal section containing all the permanent magnets of the passive assembly on a plane perpendicular to a rotation axis of the cleaning device transducer is less than or equal to 60 mm×60 mm. With this structure, the personal care appliance of the present invention is more compact and has a more attractive appearance.

In the present invention, the efficient motion of the cleaning device can be achieved by the bending characteristic of the elastic elements. FIG. 6 shows the effect of the forces $F_1$, $F_2$, $F_3$, $F_4$ on the twisting moment (torsional moment) of the first transducer elastic element 23A1 and the second transducer elastic element 23A2. As shown in FIG. 6, the permanent magnet 25 on the upper left side is subjected to the force $F_4$ as shown in the figure, and $L_6$ is the force arm $L_6$ of the force $F_4$ to the geometric centre line of the second transducer elastic element 23A2, then electromagnetic force $F_4$ generates a torque $M_6$ to the second transducer elastic element 23A2, $M_6=F_4 \cdot L_6$; the direction of $M_6$ is the clockwise direction. Likewise, the permanent magnet 24 on the upper right side is subjected to the force $F_1$, and $L_5$ is the force arm $L_5$ of the force $F_j$ to the geometric centre line of the first transducer elastic element 23A1, then the electromagnetic force $F_1$ generates a torque $M_5$ to the first transducer elastic element 23A1, $M_5=F \cdot L_5$; the direction of $M_5$ is the counterclockwise direction. According to the present invention, by reasonably configuring the shape and position of the permanent magnets as well as the shape and position of the transducer elastic elements, $M_5$ and $M_6$ can be made approximately equal in magnitude and opposite in direction. In a similar way, the torques generated by $F_3$ and $F_2$ to the second transducer elastic element 23A2 and the first transducer elastic element 23A1 are identical in magnitude and opposite in direction. Therefore, the resultant torque of the electromagnetic force on the passive assembly to the first transducer elastic element 23A1 and the second transducer elastic element 23A2 is zero. Accordingly, as long as the shape and position of the permanent magnets and the shape and position of the transducer elastic elements are reasonably designed, the bending resistant section factor (or section modulus in bending) and torsion resistant section factor (or section modulus in torsion) of the elastic elements have little effect on the implementation of the present invention, thus allowing expanding the selection range of the geometric dimensions of the transducer elastic elements.

As shown in FIGS. 2, 5 and 6, the passive assembly and the cleaning device transducer bracket 23A4 are fixedly coupled together without relative movement, and there are many ways for the fixedly coupling, such as by injection molding or by screws. In order to achieve the purpose of efficient cleaning, the personal care appliance is generally required to have a speed of about 6000 to 24000 rpm, that is, the natural frequency $f_{natural}$ of the cleaning device is 100 to 400 Hz; the relationship between the natural frequency $f_{natural}$ and the frequency $f_0$ of the electromagnetic force generated by the drive coil in the handle meets: $0.85f_0<f_{natural}<1.05f_0$. Experiments show that when the natural frequency of the cleaning device is 100 to 400 Hz, a better technological effect results. Further, the natural frequency $f_{natural}$ of the cleaning device is 250 Hz or so, and the relationship between the natural frequency $f_{natural}$ and the frequency $f_0$ of the electromagnetic force generated by the drive coil in the handle meets: $0.85f_0<f_{natural}<1.05f_0$. Taking a reciprocating rotation of 15000 rpm as an example, that is, the natural frequency of the cleaning device is about 250 Hz; experiments show that the reciprocating high-speed motion of the cleaning element at the frequency of about 250 Hz can make the air and liquid around the cleaning element interact to form a gas explosion, and this irregular turbulence can establish a process of accumulating energy and instantaneously releasing energy that is very effective in removing stubborn stains, such as dental plaque on the tooth surface and the like. Still further, the natural frequency $f_{natural}$ of the cleaning device is in a range of 220 Hz to 280 Hz, and the relationship between the natural frequency $f_{natural}$ and the frequency $f_0$ of the electromagnetic force generated by the drive coil in the handle meets: $0.85f_0<f_{natural}<1.05f_0$. Experiments further show that when the natural frequency of the cleaning device is between 220 to 280 Hz, a very effective effect similar to that obtained when the natural frequency is 250 Hz can be achieved.

The cleaning device 2A has its own natural frequency $f_{natural}$, and this cleaning device 2A can be regarded as a spring oscillator system constituted by a spring of spring stiffness factor K and a mass m. According to the vibration principle, the natural frequency $f_{natural}$ of the spring oscillator is directly proportional to $\sqrt{k/m}$, where K is the spring stiffness factor generated by all elastic elements in the cleaning device 2A being equivalent to the spring oscillator system, and m is the mass generated by all generalized mass in the cleaning device 2A being equivalent to the spring oscillator system.

In the present example shown in FIG. 6, the passive assembly is constituted by a plurality of permanent magnets and the permanent magnet carrier; the passive assembly has a greater density relative to other parts of the cleaning device 2A than the elastic elements 23A1, 23A2, and the passive assembly is on a distal end away from the elastic elements 23A1, 23A2, and thus has a larger moment of inertia; accordingly, the generalized mass of the passive assembly is a major component of the mass in the above spring oscillator system. In this embodiment, the generalized mass of the passive assembly may reach 60% of the mass of the spring oscillator system.

According to the vibration principle, when the natural frequency $f_{natural}$ of the cleaning device 2A is close to or equal to the frequency $f_0$ of the electromagnetic force generated by the drive coil 14 in the handle housing 10, the personal care appliance has a higher efficiency, and in addition, peoples always desire that the personal care appliance has a good hand feeling, its handle 1 therefore cannot be too bulky. Generally speaking, the diameter of the handle 1 should be less than 35 mm, and an efficient structure can make the handle 1 tinier so that the personal care appliance can have an aesthetical exterior. In the present invention, by reasonably designing the generalized mass of the passive assembly and the stiffness factor of the elastic elements, the electromagnetic force of a frequency $f_0$ generated by the drive coil 14 in the handle housing 10 and acting upon the cleaning device 2A brings the cleaning device 2A into a resonance oscillation state or resonant vibration state, thus an efficient system can be obtained within a small space. According to the present invention, in combination with the selection of the dimension of the passive assembly and the reasonable configuration of the elastic elements, the natural frequency range of the cleaning device 2A can be 100 Hz to 400 Hz, that is, the cleaning device 2A of this example can match the handle 1 of the personal care appliance which outputs the electromagnetic force having a frequency between 100 Hz to 400 Hz, and an efficient energy transfer between the handle 1 and the cleaning device 2A can be implemented. In this example, the relationship between the natural frequency $f_{natural}$ of the cleaning device 2A and the frequency $f_0$ of the electromagnetic force generated by the drive coil 14 in the handle 1 is:

$$0.85 f_0 < f_{natural} < 1.05 f_0.$$

Preferably, as shown in FIG. 2, 5, 6, 7, the transducer elastic element retainer 23A31 is fixedly coupled with one end of the first transducer elastic element 23A1 and one end of the second transducer elastic element 23A2 respectively, and the transmission arms 23A41, 23A42 of the transducer bracket coupling elastic element are fixedly coupled with the other end of the first transducer elastic element 23A1 and the other end of the second transducer elastic element 23A2, respectively. In this example, the first transducer elastic element 23A1 and the second transducer elastic element 23A2 are parallel with each other, and are symmetrically distributed with respect to the rotation axis or a line parallel with the rotation axis. The first transducer elastic element 23A1 and the second transducer elastic element 23A2 are located on both sides of the rotation axis of the transducer bracket 23A4 respectively, and the angle therebetween is 180°. The first transducer elastic element 23A1 and the second transducer elastic element 23A2 can be coupled with the transducer bracket 23A4 and the transducer elastic element retainer 23A31 through injection molding, and it is also possible to use a single piece of elastic element to be injection molded with the transducer bracket 23A4 and the transducer elastic element retainer 23A31. In the overall injection molding arrangement, although a single piece of elastic element is used to manufacture the first transducer elastic element 23A1 and the second transducer elastic element 23A2, since the directions of the forces acting on the first transducer elastic element 23A1 and the second transducer elastic element 23A2 are different, it still can be considered to be composed of two elastic elements.

Figure 7:
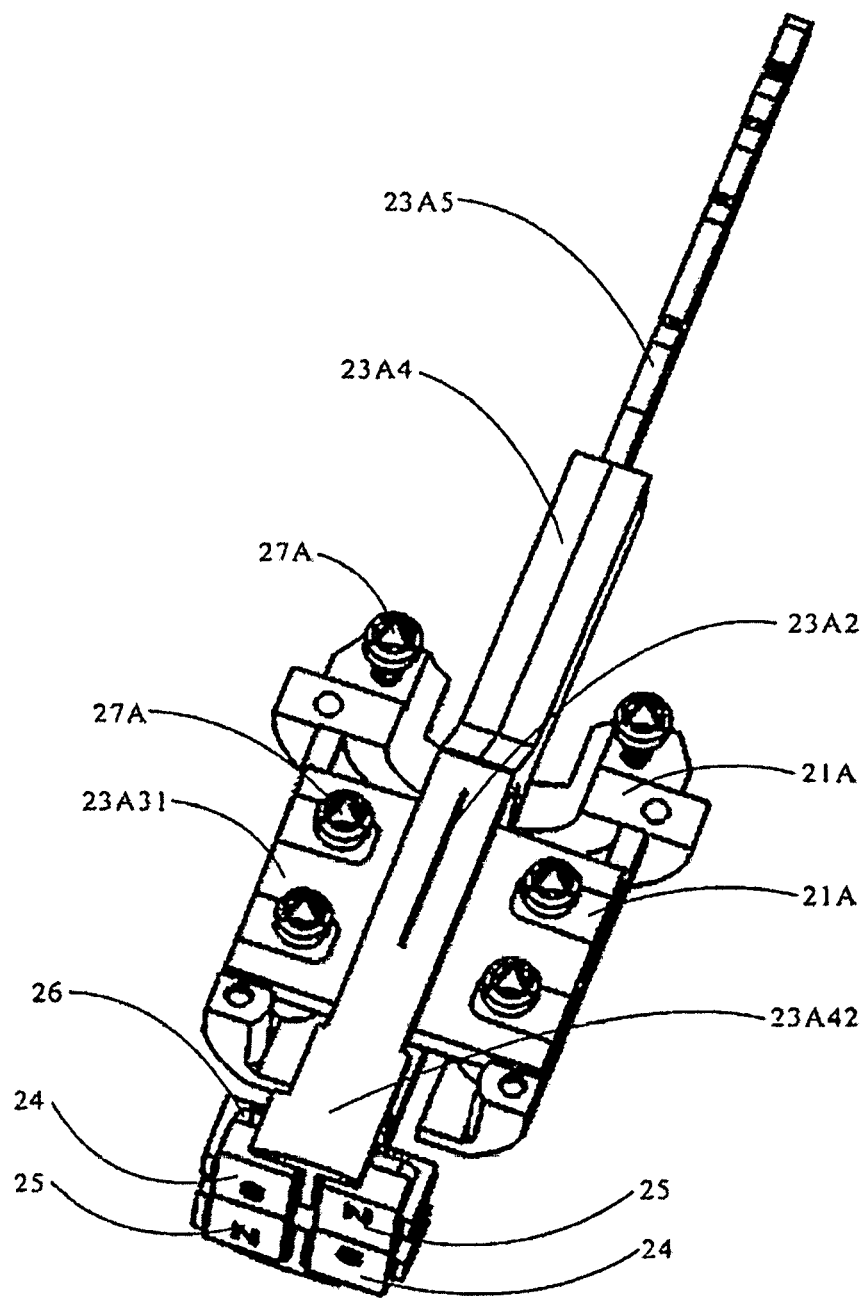
FIG. 7 is an assembly schematic view of the cleaning device transducer and the right bracket of the cleaning device in FIG. 4.

In the examples shown in FIGS. 2, 6 and 7, the cleaning device transducer 23A, the right bracket 21A of the cleaning device and the left bracket 22A of the cleaning device are fixedly connected by the locking screw 27A, wherein, the transducer elastic element retainer 23A31 is provided with a plurality of U-shaped notches (e.g., four as shown in the figures); these U-shaped notches cooperate with the corresponding number of protrusions on the transducer right bracket 21A to determine the relative mounted positions of the cleaning device transducer 23A and the right bracket 21A of the cleaning device. The transducer elastic element retainer 23A31 is fixedly connected with the left and right brackets 22A, 21A of the cleaning device by the locking screw 27A, and therefore, there is no relative movement between the transducer elastic element retainer 23A31 and the left and right brackets 22A, 21A of the cleaning device. In this example, the cleaning device transducer bracket 23A4 is coupled with the transducer elastic element retainer 23A31 through the first transducer elastic element 23A1 and the second transducer elastic element 23A2. When the cleaning device 2A is not in operation, the transducer 23A is fixed to the left and right brackets 22A, 21A of the cleaning device, and the left and right brackets 22A, 21A are screwed to the handle housing 10 through the cleaning device housing 20A. When the cleaning device 2A is operated, the transducer bracket 23A4 and the transducer elastic element retainer 23A31 generate relative movement through the synergistic action of all elastic elements in the transducer elastic assembly, whereas the transducer elastic element retainer 23A31 is fixedly coupled to the left and right brackets 22A, 21A of the cleaning device and keeps in a stationary state, and therefore, only the transducer bracket 23A4 moves with respect to the transducer elastic element retainer 23A31. The cleaning element carrier coupling shaft 23A5 extends upward into the cleaning element carrier 3A, and the above coupling may be a fixed coupling, so that thus the motion and energy are transferred to the cleaning element carrier 3A through the cleaning element carrier coupling shaft 23A5, and then to the cleaning elements 4A through the cleaning element carrier 3A.

As shown in FIGS. 1, 2, 3, 3B and 3C, the cleaning device housing 20A has a threaded configuration, and the handle housing 10 has a threaded configuration which mates with the threaded configuration of the cleaning device housing 20A. In this embodiment, after the cleaning device is partially inserted into the recess of the upper portion of the drive handle 1, the cleaning device 2A is tightly locked to the drive handle 1 through the threaded coupling of the cleaning device housing 20A and the handle housing 10. When the user fixes the cleaning device 2A to the drive handle 1 and starts the drive handle 1, an alternating current of a frequency $f_0$ flows through the drive coil 14 of the drive handle 1, and the magnetic field generated by the permanent magnets 24, 25 of the passive assembly of the cleaning device interacts with the energized drive coil 14 to generate electromagnetic forces. By reasonably configuring the number and position of the permanent magnets 24, 25 with respect to the drive coil 14, the electromagnetic force received by the passive assembly is substantially balanced, and a torque M is generated. Due to the alternating current flowing through the drive coil 14, the direction of the torque acting on the passive assembly is also alternating, and due to the fixed coupling of the passive assembly with the cleaning device transducer 23A, the cleaning device transducer 23A receives motion and energy from the passive assembly.

As shown in FIG. 6, assuming that in the initial state, the direction of the torque of the passive assembly for driving the cleaning device transducer 23A is a clockwise direction, the transducer elastic element retainer 23A31 is fixed to the left and right brackets 22A, 21A of the cleaning device, and the elastic assembly is fixed to the transducer bracket 23A4, when the transducer bracket 23A4 is driven by the passive assembly to rotate clockwise, the transmission arm 23A41 of the transducer bracket coupling elastic element drives the first transducer elastic element 23A1 to bend in the clockwise direction, the first transducer elastic element 23A1 generates bending strain and stores energy, and the first transducer elastic element 23A1 generates bending strain around the transducer elastic element retainer 23A31 in the clockwise direction. If the torque corresponds to the transducer elastic element retainer 23A31, the first transducer elastic element 23A1 is equivalent to be subjected to a force $F_5$ inwardly perpendicular to the paper surface at the zone of the transmission arm of the transducer bracket coupling elastic element, and the force arm thereof is the distance of the equivalent force F5 to the contact line of the transducer elastic element retainer 23A31 and the first transducer elastic element 23A1 along the direction toward the force F5. At the same time, the transmission arm 23A42 of the transducer bracket coupling elastic element drives the second transducer elastic element 23A2 to bend in the clockwise direction, the second transducer elastic element 23A2 generates bending strain and stores energy, and the second transducer elastic element 23A2 also generates bending strain around the transducer elastic element retainer 23A31 in the clockwise direction. If the torque corresponds to the transducer elastic element retainer 23A31, the second transducer elastic element 23A2 is equivalent to be subjected to a force F6 outwardly perpendicular to the paper surface at the zone of the transmission arm of the transducer bracket coupling elastic element, and the force arm thereof is the distance of the equivalent force F6 to the contact line of the transducer elastic element retainer 23A31 and the second transducer elastic element 23A2 along the direction toward the force F6. Obviously, the forces received by the elastic assembly are substantially balanced; the cleaning device transducer 23A is only subjected to a clockwise torque. Vice versa, when the passive assembly is driven by the drive coil 14 in the handle housing 10 to rotate in the counterclockwise direction, similar to the above analysis, the forces upon the cleaning device transducer 23A are substantially balanced, and the cleaning device transducer 23A is only subjected to a counterclockwise torque, and therefore, the cleaning device transducer 23A makes a reciprocating rotation in response to the drive of the drive coil 14 in the handle housing 10. The cleaning elements 4A are coupled to the transducer 23A through the cleaning element carrier 3A, and the cleaning device transducer 23A drives the cleaning elements 4A to rotate in a reciprocating manner.

As shown in FIGS. 5 and 6, the present embodiment creatively introduces at least two transducer elastic elements 23A1, 23A2, and the bending strain of the elastic material is used to constitute a cleaning device 2A having a natural vibration frequency $f_{natural}$. According to the vibration principle, the cleaning device 2A is forced to reciprocally rotate by the driving frequency $f_0$ of the drive coil 14 in the handle housing 10. When the natural frequency $f_{natural}$ of the cleaning device 2A is very close to the driving frequency $f_0$, the electromagnetic force generated by the drive coil 14 in the handle housing 10 and acting upon the cleaning device 2A brings the cleaning device 2A into a resonance oscillation state, when the natural frequency $f_{natural}$ of the cleaning device 2A is equal to the driving frequency $f_0$, the electromagnetic force generated by the drive coil 14 in the handle housing 10 and acting upon the cleaning device 2A brings the cleaning device 2A into a resonant vibration state. It is well known that the energy transfer efficiency in a resonance oscillation state or resonant vibration state is very high. In an existing drive structure using a bearing (e.g., the ball bearing), a restraining piece, such as the bearing and so forth, is provided to prevent other motions of the cleaning device than the rotary motion; however, such a constraint will bring noise and energy loss while increasing the cost. In the present invention, due to the reasonable configuration of elastic elements and permanent magnets, it is possible to achieve a smooth rotation of the cleaning device 2A, thereby eliminating some of the restraining pieces that must be provided in order to achieve the rotation of the cleaning device (such as bearings etc). In the present invention, since the permanent magnets are reasonably arranged so that the electromagnetic resultant force received on the passive assembly is zero, and a torque acting on the passive assembly is cleverly utilized, it is possible to eliminate the restraining structure, and thus the cleaning device is made more compact in structure, more stable in rotation, and less noisy. Furthermore, compared with a structure in which only one transducer elastic element is provided, the cleaning device structure of the present invention has lower noise and higher efficiency.

Figure 8:
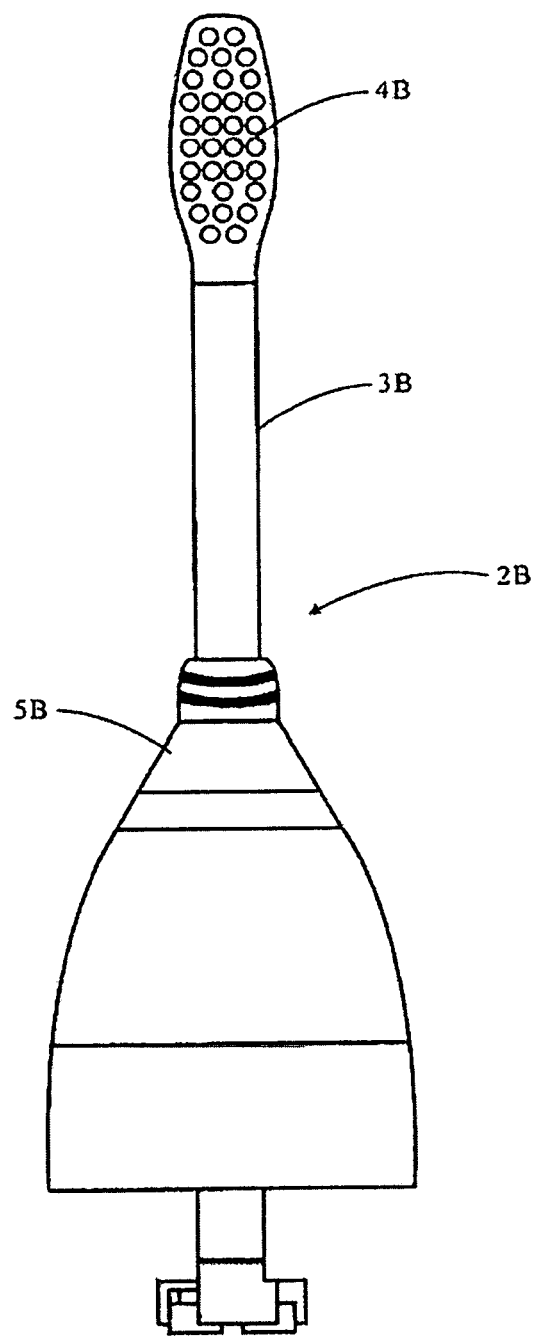
FIG. 8 is a front view of another type of cleaning device for personal cleaning care.
Figure 9:
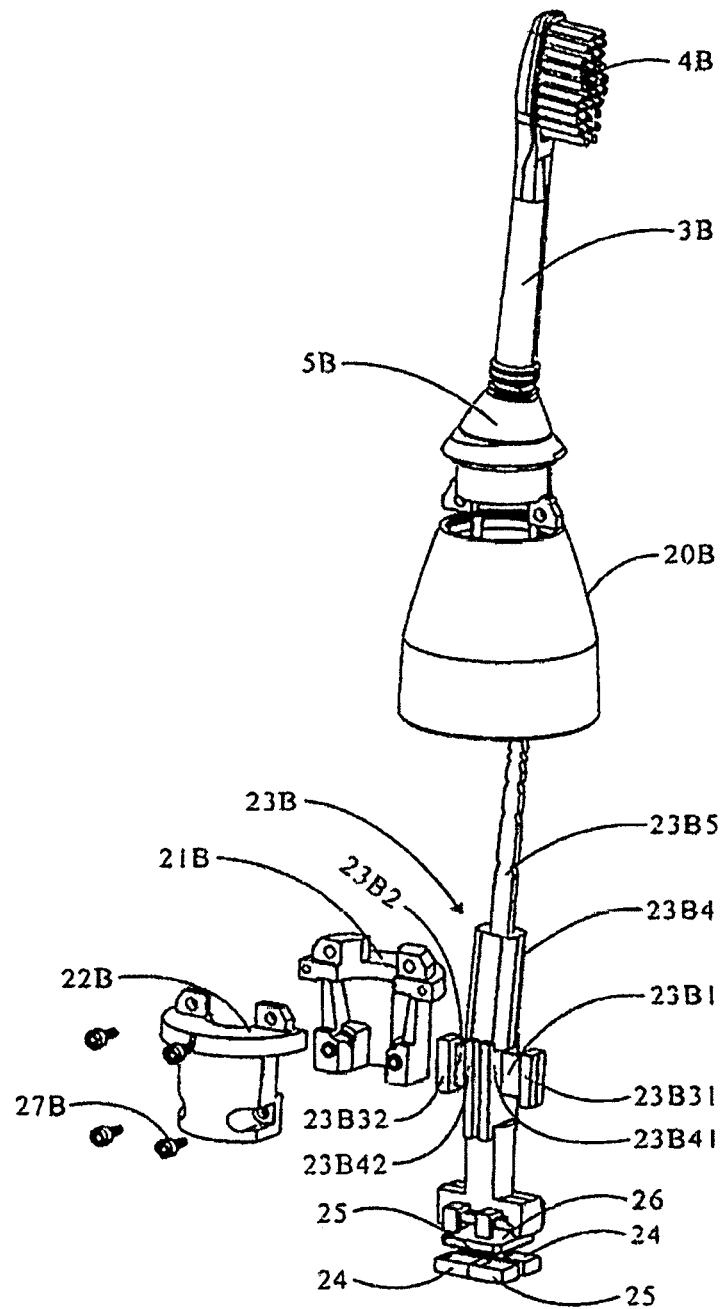
FIG. 9 is an exploded schematic view of the cleaning device shown in FIG. 8.
Figure 10:
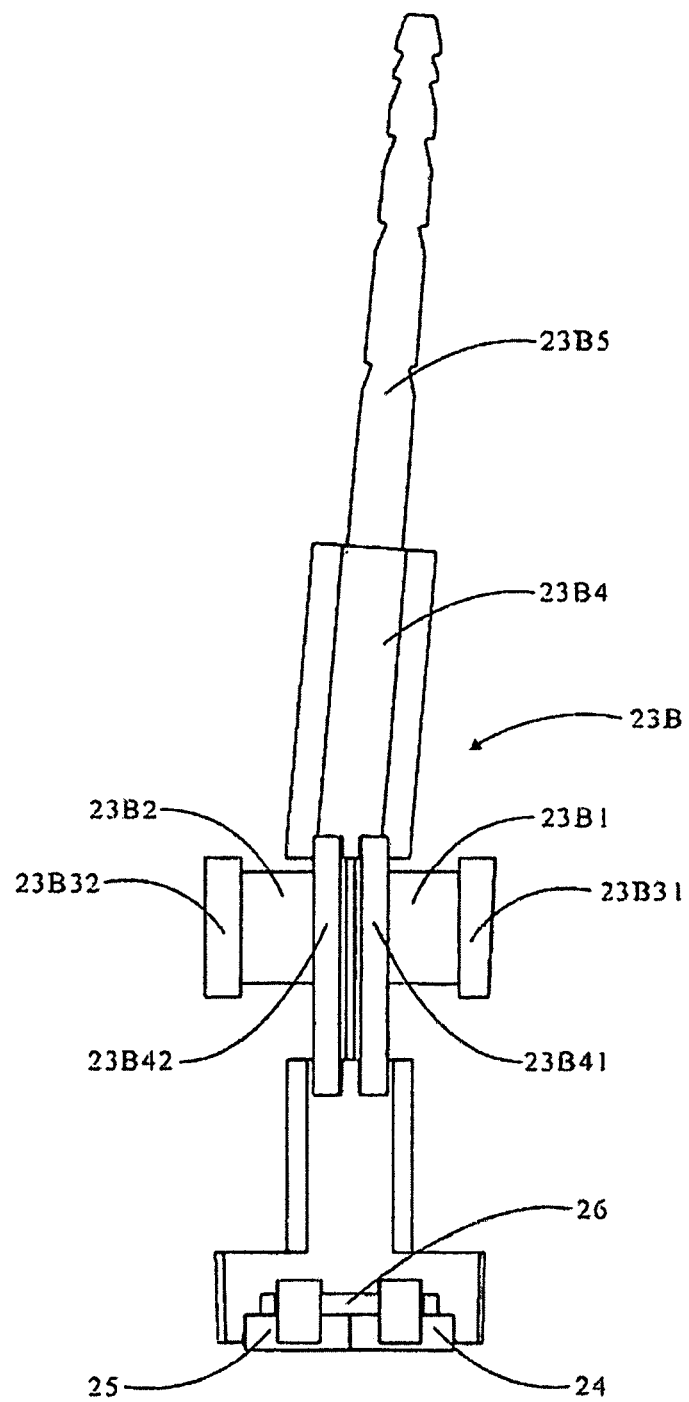
FIG. 10 is a perspective view of the cleaning device transducer in FIG. 8.

FIGS. 8, 9 and 10 illustrate another type of cleaning device transducer 23B. As shown in the figure, the cleaning device transducer 23B comprises the first transducer elastic element 23B1, the second transducer elastic element 23B2, the transducer bracket 23B4, the first transducer elastic element retainer 23B31, the second transducer elastic element retainer 23B32, and the cleaning element carrier coupling shaft 23B5, and the above parts may be molded as the cleaning device transducer 23B through overall injection molding.

The transducer elastic element retainers 23B31, 23B32 are provided on the outer side of the transducer bracket 23B4 respectively, the right and left brackets 21B, 22B of the cleaning device and the transducer elastic element retainers 23B31, 23B32 are fixedly coupled together through the locking screw 27B. In this example, the first transducer elastic element 23B1 and the second transducer elastic element 23B2 are parallel with each other, and are symmetrically distributed with respect to the rotation axis or a line parallel with the rotation axis. The first transducer elastic element 23B1 and the second transducer elastic element 23B2 are located on both sides of the rotation axis of the transducer bracket, the angle between the first transducer elastic element 23B1 and the second transducer elastic element 23B2 is 180°. Assuming that, when the drive coil 14 applies an electromagnetic force to the permanent magnets 24, 25 and the passive assembly is subjected to a clockwise torque, the transmission arms 23B41, 23B42 of the transducer bracket coupling elastic element of the cleaning device transmit a torque to the first and second transducer elastic elements 23B1, 23B2, so that the first transducer elastic element 23B1 generates bending strain around the transducer elastic element retainer 23B31 in the counterclockwise direction, and so that the second transducer elastic element 23B2 also generates bending strain in the counterclockwise rotation direction around the transducer elastic element retainer 23B32. The transducer 23B rotates clockwise around a rotation axis. On the contrary, when the passive assembly is subjected to a counterclockwise torque, the transmission arms 23B41, 23B42 of the transducer bracket coupling elastic element of the cleaning device transmit a torque to the first and second transducer elastic elements 23B1, 23B2, so that the first and second transducer elastic elements 23B1, 23B2 generates clockwise bending strains around respective transducer elastic element retainers 23B31, 23B32. The transducer 23B makes a counterclockwise rotation around the rotation axis. The motion analysis of such a cleaning device is similar to the motion analysis of the former cleaning device.

Figure 11:
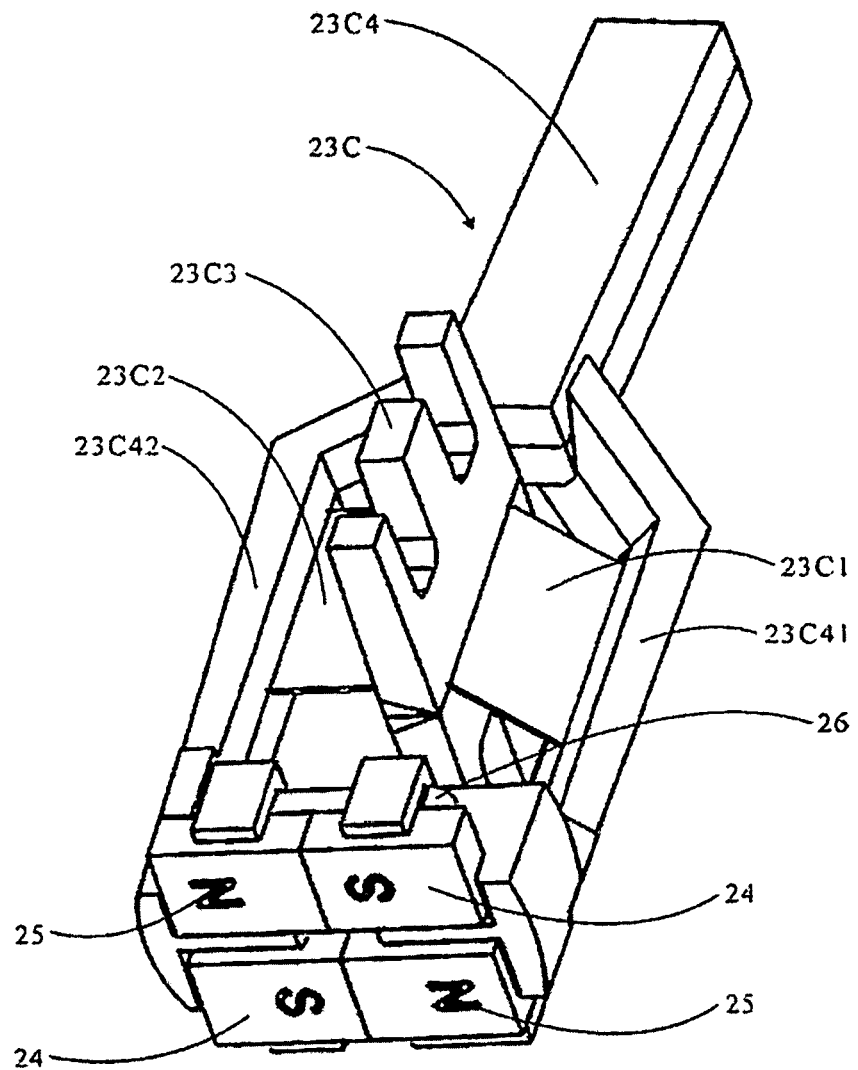
FIG. 11 is a perspective view of still another type of cleaning device transducer.
Figure 12:
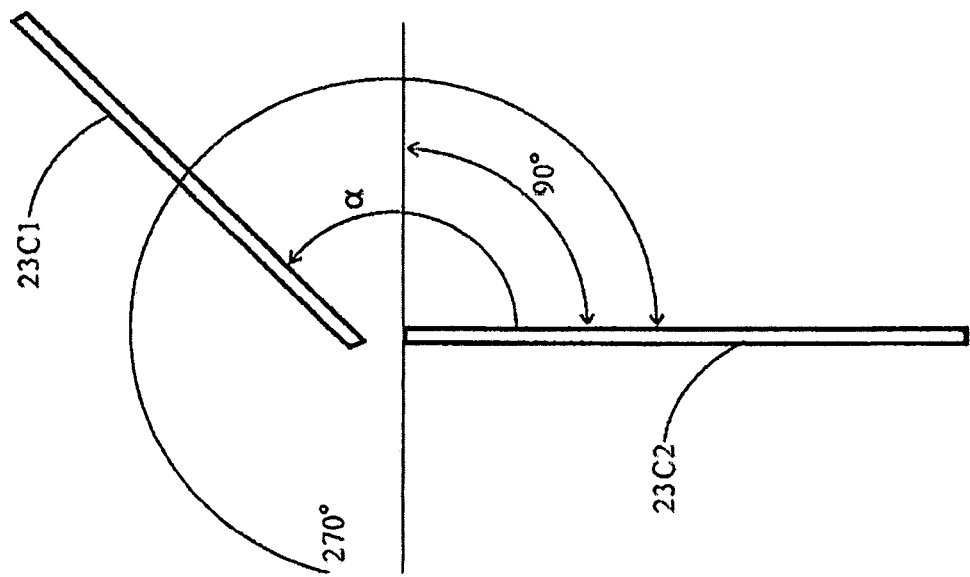
FIG. 12 is a schematic view showing the relative position of the two transducer elastic elements in FIG. 11.

FIGS. 11 and 12 illustrate still another type of cleaning device transducer 23C. With respect to the transducer 23A of the cleaning device 2A, the first transducer elastic element 23C1 and the second transducer elastic element 23C2 in this arrangement are provided on both sides of the rotation axis of the transducer, and the angle therebetween is α, where 90°<α<180°, or may also be 90°<α<270°. The motion analysis in this arrangement is as stated above and their principles are identical.

Figure 13:
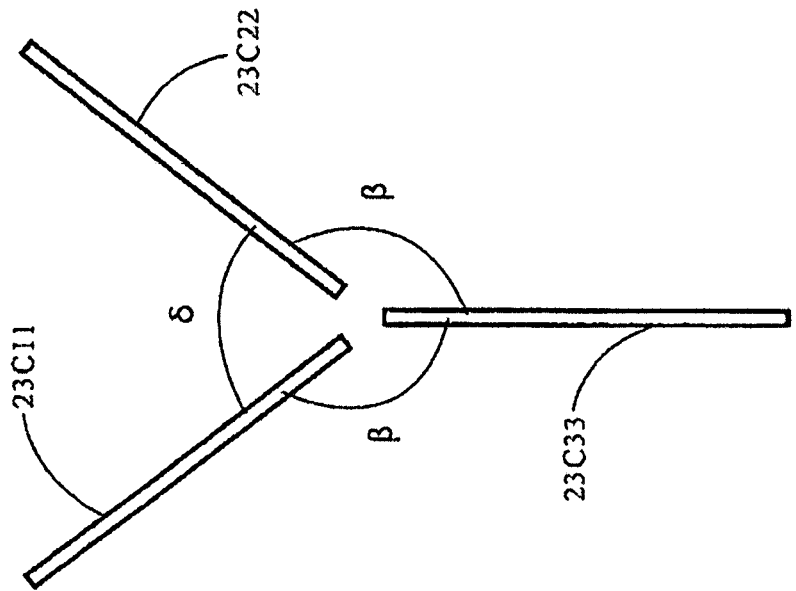
FIG. 13 is a schematic view showing the relative position of three transducer elastic elements.

Although the above description has been made with two transducer elastic elements as an example, the present invention is not limited to the two as shown in this example. For example, as shown in FIG. 13, the transducer 23C may comprise three transducer elastic elements: the transducer elastic element 23C11, the transducer elastic element 23C22 and the transducer elastic element 23C33. The angles of the transducer elastic element 23C11 and the transducer elastic element 23C22 with respect to the transducer elastic element 23C33 both can be β, where 90°<β<180°, and the angle of the transducer elastic element 23C11 with respect to the transducer elastic element 23C22 can be δ, where δ=360°−2β. As shown in FIG. 13, by reasonably setting the shape and dimension of the transducer elastic element 23C11, the transducer elastic element 23C22 and the transducer elastic element 23C33 as well as the relative positions thereof, it is also possible that the cleaning device transducer 23C is mechanically balanced and bear a torque.

Of course, more transducer elastic elements may be provided without departing from the scope of the present invention, which will not be enumerated here.

The present invention creatively introduces at least two transducer elastic elements, and these transducer elastic elements are distributed around the rotation axis of the cleaning device transducer or a line parallel with the rotation axis. The angel between at least two transducer elastic elements is greater than 90° and less than 270°; the angle of the torque applied to the two transducer elastic elements with respect to the equivalent force of the respective transducer elastic element retainers is greater than 90° and less than 270°; and the equivalent force and the moment of the respective transducer elastic element retainers have the same direction. It is preferable to provide two transducer elastic elements having an angle of 180° and to distribute them symmetrically with respect to a rotation axis or a line parallel with the rotation axis so that the forces on all transducer elastic elements are equivalent to the electromagnetic resultant force on the rotation axis of the cleaning device transducer and the electromagnetic resultant force is substantially zero, and a torque around the rotation axis of the cleaning device transducer or a line parallel with the rotation axis is produced. In comprehensive consideration of the mechanical properties and frequency response performances of the transducer elastic elements, it is preferred that the transducer elastic elements in this example are sheet type elastic elements. It is further preferred that the thicknesses of the sheet type elastic elements are smaller than their lengths and the widths. It is most preferred that the thicknesses of the sheet type elastic elements are between 0.05 mm and 1 mm.

The transducer of the present example is provided with at least two elastic elements. Two or more elastic elements may be equivalent to a plurality of springs, and the plurality of springs are equivalent to a virtual spring. The virtual spring and the mass m constitute a spring oscillator system. The spring stiffness factor in the spring oscillator system is the stiffness factor of this virtual spring, so the performance of a single elastic element directly affects the spring stiffness factor in the spring oscillator system. In the following, a description is made by taking a rectangular elastic element (a type of sheet type elastic element) as an example. Definition: $K_{1rectangular}$ is an equivalent stiffness factor of a single rectangular elastic element when being subjected to bending deformation; the geometrical thickness of the rectangular elastic element in the force direction is h; the geometric dimension of the rectangular elastic element in a direction from the force bearing point toward a fixation point, i.e., the direction of the force arm, has a length L and a width b; according to the principle of solid mechanics, the $K_{1rectangular}$ is directly proportional to $bh^3/L^3$, and the thickness h is in high correlation with the stiffness factor $K_{1rectangular}$, thus by adjusting the thickness h, different $K_{1rectangular}$ can be obtained.

Preferably, the thickness of the sheet type elastic element is between 0.05 mm and 1 mm.

The circular elastic elements and sheet type elastic element are common elastic elements in industrial applications, and they are easy to be obtained from the market. In the following, the equivalent stiffness factors are analyzed for the rectangular elastic element (a type of the sheet type elastic element) and the circular elastic element, when the elastic element is in a bending motion. The diameter of the circular elastic element is defined as d. The magnitude of the equivalent stiffness factor $K_1$ of the elastic element is directly proportional to the motion amplitude of the cleaning element. Since the equivalent stiffness factor $K_{1rectangular}$ of the rectangular elastic element is proportional to the $bh^3/L^3$, the equivalent stiffness factor $K_{1circular}$ of the circular elastic element is proportional to $d^4/L^3$ thus for the adjustment of the equivalent stiffness factor K1, the rectangular elastic element has a larger adjustable extent than the circular elastic element. For example, if the width b of the rectangular elastic element is adjusted to be 1.1 times the initial value, the equivalent stiffness factor $K_{1rectangular}$ becomes 1.1 times the initial value. Whereas when the diameter d of the circular elastic element is adjusted to 1.1 times the initial value, the equivalent stiffness factor $K_{1circular}$ becomes 1.74 times the initial value. Obviously, the rectangular elastic element is more likely to obtain different stiffness factor than the circular elastic element by adjusting the geometric dimensions of the members.

From the above, the rectangular elastic element may achieve a fine tuning of the equivalent stiffness factor $K_{1rectangular}$ of the elastic element by adjusting the value of the width b of the elastic element, and it may also achieve a coarse tuning of the equivalent stiffness factor $K_{1rectangular}$ of the elastic element by adjusting the value of the thickness h of the elastic element. The analyses about the sheet type elastic element and rectangular elastic element are similar to each other, and in consideration of the dimensions of the member, the sheet type elastic element is preferable for the present invention.

Figure 14:
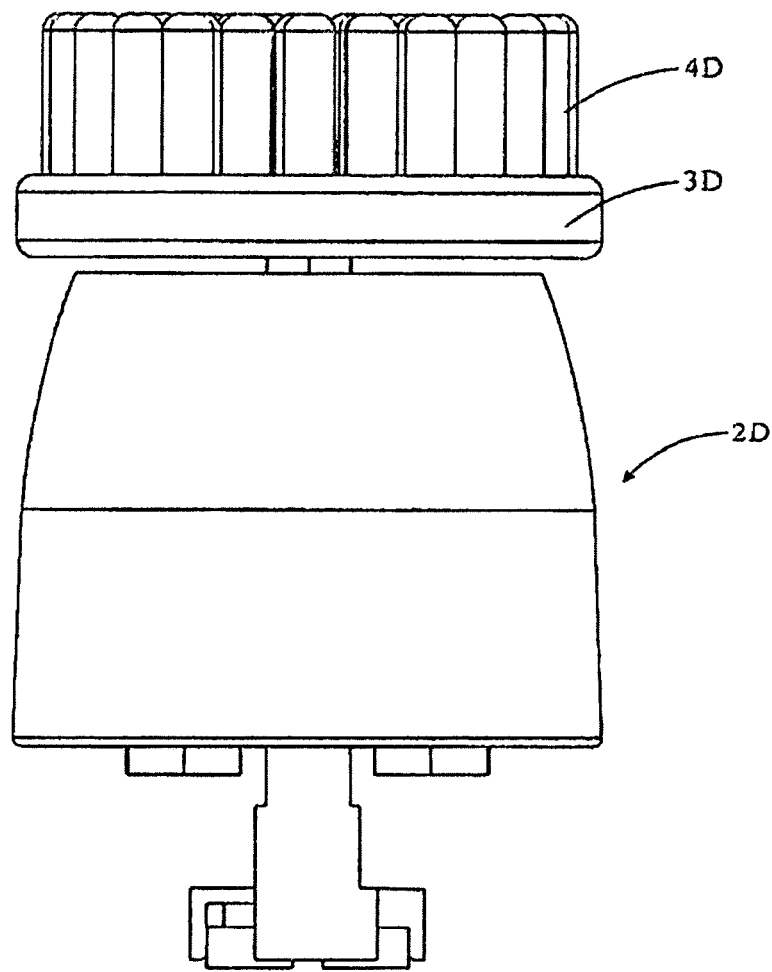
FIG. 14 is a front view of the electric face cleansing instrument.
Figure 15:
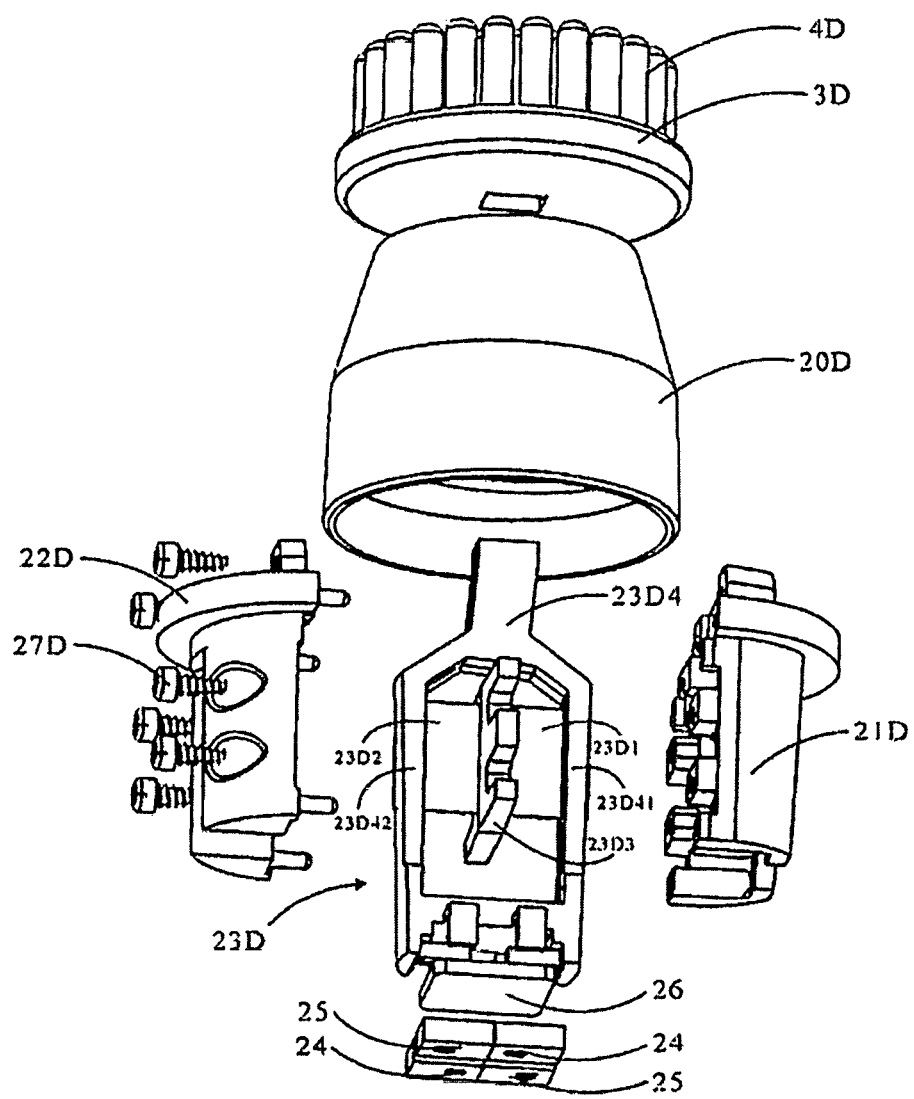
FIG. 15 is an exploded view of the electric face cleansing instrument shown in FIG. 14.

As stated above, in order to make the personal care appliance have an efficient energy conversion performance, the natural frequency $f_{natural}$ of the cleaning device should be close to or equal to the frequency $f_0$ of the electromagnetic force generated by the drive coil in the handle housing 10. Likewise, $f_{natural}$ is in proportional to $\sqrt{k/m}$, and in the present example, different values of the stiffness factors K can be obtained by adjusting the thickness h of the sheet type elastic element, so that $0.85f_0 < f_{natural} < 1.05f_0$. FIGS. 14 and 15 illustrate the situation where the present invention is applied to the electric face cleansing instrument. As shown in the figures, the transducer bracket 23D4 couples with the cleaning element carrier 3D, When the alternating current flows through the drive coil in the handle, an electromagnetic force is generated, and the electromagnetic force drives the cleaning device transducer. With the cleaning device structure of the present invention, the energy and motion can be transferred to the cleaning element smoothly, with low noise, high-efficiently and with low cost, thus achieving the high-speed reciprocating rotary motion of the cleaning element.

In the course of use, the personal care appliances will inevitably come into contact with the liquid, and thus the personal care appliance is usually sealed, that is, it is water-proof. Since the handle is sealed, and the power devices inside the handle have a poor heat dissipation condition, it is necessary to control the power consumption of the power devices in the personal care appliance. According to the present invention, by reasonably distributing the permanent magnets and the elastic elements so as to constitute an efficient moving mechanism, it is possible to improve the efficiency of the personal care appliance, and to ensure that the maximum input power of the electric toothbrush or the electric shaver is less than 6 W, to ensure that the maximum input power of the electric face cleansing instrument is less than 10 W, and to ensure that the maximum input power of the electric shower is less than 15 W.

What is claimed is:

1. A personal cleaning care appliance comprising a handle with a handle housing and a cleaning device converting a reciprocating motion into a rotary motion,
    the cleaning device comprising:
    a cleaning device housing detachably connected to the handle housing; a bracket for supporting the cleaning device, detachably fixed to the cleaning device housing; a cleaning element carrier and cleaning elements distributed on the cleaning element carrier, wherein one end of the cleaning element carrier opposite to an end of the cleaning element carrier having the cleaning elements distributed is coupled with the cleaning device housing with a seal;
    a cleaning device transducer;
    a passive assembly which is located above a drive coil in the handle housing and comprises a permanent magnet carrier and a plurality of permanent magnets, wherein the permanent magnet carrier is fixed to an end of the cleaning device transducer opposite to a cleaning element carrier coupling shaft, the plurality of permanent magnets are fixed to the permanent magnet carrier;
    wherein the cleaning device transducer comprises a transducer bracket, at least two transducer elastic elements, transducer elastic element retainers and the cleaning element carrier coupling shaft, the cleaning element carrier coupling shaft is tightly inserted into the cleaning element carrier so that the cleaning device transducer is fixedly coupled with the cleaning element carrier; one end of each transducer elastic element is fixedly coupled with a corresponding transducer elastic element retainer, and the other end of each transducer elastic element is fixedly coupled with a transmission arm of the transducer bracket coupling elastic element;
    wherein the cleaning device having a natural vibration frequency $f_{natural}$ is constituted utilizing a bending strain of an elastic material, so that the natural frequency $f_{natural}$ of the cleaning device is in a range of 100 Hz to 400 Hz, and a relationship between the natural frequency $f_{natural}$ and a frequency $f_0$ of an electromagnetic force generated by the drive coil in the handle meets $0.85 f_0 < f_{natural} < 1.05 f_0$,
    wherein the plurality of permanent magnets are configured in such a way that, when an alternating current flows through the drive coil fixed in the handle housing, the drive coil and the plurality of permanent magnets interact to generate an electromagnetic force, such that a resultant force of the electromagnetic forces generated between the drive coil and the plurality of permanent magnets and acting on the passive assembly is close to zero, i.e., the forces acting on the passive assembly is balanced, and at the same time, the passive assembly is subjected to a torque rotating in a clockwise or counterclockwise direction formed by the electromagnetic forces, wherein a maximum projection area formed by projecting a minimum plane of a same horizontal section containing all the permanent magnets of the passive assembly on a plane perpendicular to a rotation axis of the cleaning device transducer is less than 60 mm×60 mm.

2. The personal cleaning care appliance according to claim 1, wherein the maximum projection area formed by projecting the minimum plane of the same horizontal section containing all the permanent magnets of the passive assembly on the plane perpendicular to the rotation axis of the cleaning device transducer is less than 30 mm×30 mm.

3. The personal cleaning care appliance according to claim 2, wherein the transducer elastic elements comprise rectangular elastic elements or sheet type elastic elements.

4. The personal cleaning care appliance according to claim 2, wherein the personal cleaning care appliance is an electric toothbrush.

5. The personal cleaning care appliance according to claim 1, wherein the transducer elastic elements comprise a first transducer elastic element and a second transducer elastic element, which are parallel with each other and are symmetrically distributed with respect to a rotation axis or a line parallel with the rotation axis, and are located on both sides of the rotation axis of the transducer bracket respectively, and the angle between the first and second transducer elastic elements is 180°.

6. The personal cleaning care appliance according to claim 5, wherein the transducer elastic elements comprise rectangular elastic elements or sheet type elastic elements.

7. The personal cleaning care appliance according to claim 5, wherein the personal cleaning care appliance is an electric toothbrush.

8. The personal cleaning care appliance according to claim 5, wherein the personal cleaning care appliance is an electric face cleansing instrument.

9. The personal cleaning care appliance according to claim 1, wherein the transducer elastic elements comprise a first transducer elastic element and a second transducer elastic element, which are located on both sides of the rotation axis of the transducer, and the angle between the first and second transducer elastic elements is $\alpha$, wherein $90° < \alpha < 270°$.

10. The personal cleaning care appliance according to claim 9, wherein, $90° < \alpha < 180°$.

11. The personal cleaning care appliance according to claim 10, wherein the transducer elastic elements comprise rectangular elastic elements or sheet type elastic elements.

12. The personal cleaning care appliance according to claim 10, wherein the personal cleaning care appliance is an electric toothbrush.

13. The personal cleaning care appliance according to claim 10, wherein the personal cleaning care appliance is an electric face cleansing instrument.

14. The personal cleaning care appliance according to claim 9, wherein the transducer elastic elements comprise rectangular elastic elements or sheet type elastic elements.

15. The personal cleaning care appliance according to claim 9, wherein the personal cleaning care appliance is an electric toothbrush.

16. The personal cleaning care appliance according to claim 9, wherein the personal cleaning care appliance is an electric face cleansing instrument.

17. The personal cleaning care appliance according to claim 1, wherein the transducer elastic elements comprise three transducer elastic elements, wherein any two of the transducer elastic elements have an angle β with respect to the third transducer elastic element, and 90°<β<180°, and an angle between the any two transducer elastic elements is δ, δ=360°−2β.

18. The personal cleaning care appliance according to claim 17, wherein the transducer elastic elements comprise rectangular elastic elements or sheet type elastic elements.

19. The personal cleaning care appliance according to claim 17, wherein the personal cleaning care appliance is an electric toothbrush.

20. The personal cleaning care appliance according to claim 17, wherein the personal cleaning care appliance is an electric face cleansing instrument.

21. The personal cleaning care appliance according to claim 1, wherein the transducer elastic elements comprise rectangular elastic elements or sheet type elastic elements.

22. The personal cleaning care appliance according to claim 21, wherein the sheet type elastic elements each has a thickness less than its length and width, and the thickness is between 0.05 mm to 1 mm.

23. The personal cleaning care appliance according to claim 22, wherein the plurality of permanent magnets comprise two first permanent magnets respectively disposed on left and right sides of the drive coil and two second permanent magnets respectively disposed on the left and right sides of the drive coil, wherein an S-pole of each of the first permanent magnets may face the drive coil and an N-pole of each of the second permanent magnets may face the drive coil, wherein the second permanent magnet on the left side and the first permanent magnet on the left side are substantially symmetrically distributed with respect to an iron core of the drive coil; the first permanent magnet on the right side and the second permanent magnet on the right side are substantially symmetrically distributed with respect to the iron core of the drive coil; a transversal center line of the second permanent magnet on the upper left side is aligned with a transversal center line of the first permanent magnet on the upper right side; a transversal center line of the first permanent magnet on the lower left side is aligned with a transversal center line of the second permanent magnet on the lower right side; the above two transversal center lines are parallel with each other; and when a current is energized, a current direction of a current formed by projecting the current in the drive coil on a plane of the first permanent magnet on the same side is opposite to a current direction of a current formed by projecting the current in the drive coil on a plane of the second permanent magnet on the same side at the same time.

24. The personal cleaning care appliance according to claim 1, wherein the plurality of permanent magnets comprise two first permanent magnets respectively disposed on left and right sides of the drive coil and two second permanent magnets respectively disposed on the left and right sides of the drive coil, wherein an S-pole of each of the first permanent magnets may face the drive coil and an N-pole of each of the second permanent magnets may face the drive coil, wherein the second permanent magnet on the left side and the first permanent magnet on the left side are substantially symmetrically distributed with respect to an iron core of the drive coil; the first permanent magnet on the right side and the second permanent magnet on the right side are substantially symmetrically distributed with respect to the iron core of the drive coil; a transversal center line of the second permanent magnet on the upper left side is aligned with a transversal center line of the first permanent magnet on the upper right side; a transversal center line of the first permanent magnet on the lower left side is aligned with a transversal center line of the second permanent magnet on the lower right side; the above two transversal center lines are parallel with each other; and when a current is energized, a current direction of a current formed by projecting the current in the drive coil on a plane of the first permanent magnet on the same side is opposite to a current direction of a current formed by projecting the current in the drive coil on a plane of the second permanent magnet on the same side at the same time.

25. The personal cleaning care appliance according to claim 1, wherein the personal cleaning care appliance is an electric face cleansing instrument.

\* \* \* \* \*